(12) United States Patent
Sakamoto et al.

(10) Patent No.: US 11,280,729 B2
(45) Date of Patent: Mar. 22, 2022

(54) OPTICAL DENSITY MEASURING APPARATUS AND OPTICAL WAVEGUIDE

(71) Applicant: Asahi Kasei Microdevices Corporation, Tokyo (JP)

(72) Inventors: Toshiro Sakamoto, Tokyo (JP); Takaaki Furuya, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 74 days.

(21) Appl. No.: 16/826,294

(22) Filed: Mar. 23, 2020

(65) Prior Publication Data
US 2020/0309691 A1    Oct. 1, 2020

(30) Foreign Application Priority Data

Mar. 25, 2019 (JP) ............................. JP2019-057300
Jan. 28, 2020 (JP) ............................. JP2020-011747

(51) Int. Cl.
*G01N 21/47* (2006.01)
*G01N 21/84* (2006.01)

(52) U.S. Cl.
CPC ......... *G01N 21/4788* (2013.01); *G01N 21/84* (2013.01); *G01N 2201/062* (2013.01); *G01N 2201/0635* (2013.01)

(58) Field of Classification Search
CPC ........... G01N 21/5907; G01N 21/3504; G01N 2021/3536; G01N 21/4788; G01N 21/84; G01N 2201/062; G01N 2201/0635; G02B 6/29304

USPC ................................ 356/432–448, 300–334
See application file for complete search history.

(56) References Cited

U.S. PATENT DOCUMENTS

| | | | |
|---|---|---|---|
| 5,082,629 A * | 1/1992 | Burgess, Jr | G01N 21/552 356/128 |
| 6,961,490 B2 * | 11/2005 | Maisenhoelder | G02B 6/34 385/37 |
| 7,194,166 B1 | 3/2007 | Gunn, III | |
| 10,365,435 B1 | 7/2019 | Karimelahi et al. | |

(Continued)

FOREIGN PATENT DOCUMENTS

| | | | |
|---|---|---|---|
| JP | 2003289153 A | 10/2003 | |
| JP | 2005300212 A | 10/2005 | |

(Continued)

*Primary Examiner* — Isiaka O Akanbi
(74) *Attorney, Agent, or Firm* — Kenja IP Law PC

(57) ABSTRACT

An optical density measuring apparatus for measuring density of a gas or a liquid to be measured includes a light source capable of irradiating light into a core layer, a detector capable of receiving light propagated through the core layer, and an optical waveguide that includes a substrate and the core layer. The core layer includes a light propagation unit and a first diffraction grating unit that receives light from the light source and guides the light to the light propagation unit, which includes a propagation channel capable of propagating light in an extending direction of the light propagation unit. The first diffraction grating unit is disposed near to and facing a light-emitting surface of the light source. The first diffraction grating unit includes first diffraction gratings, at least two of which receive light emitted from the same light-emitting surface of the light source.

20 Claims, 19 Drawing Sheets

(56) References Cited

U.S. PATENT DOCUMENTS

| | | | | |
|---|---|---|---|---|
| 2002/0076154 A1* | 6/2002 | Maisenhoelder | .. | G01N 21/7743 385/37 |
| 2014/0379299 A1* | 12/2014 | Kulkarni | ............ | G01N 33/0062 702/182 |
| 2018/0195945 A1 | 7/2018 | Schneider et al. | | |
| 2019/0339197 A1* | 11/2019 | Boutami | .............. | G01N 29/032 |

FOREIGN PATENT DOCUMENTS

| | | |
|---|---|---|
| JP | 2016148717 A | 8/2016 |
| JP | 2018146568 A | 9/2018 |
| JP | 2018528450 A | 9/2018 |

* cited by examiner

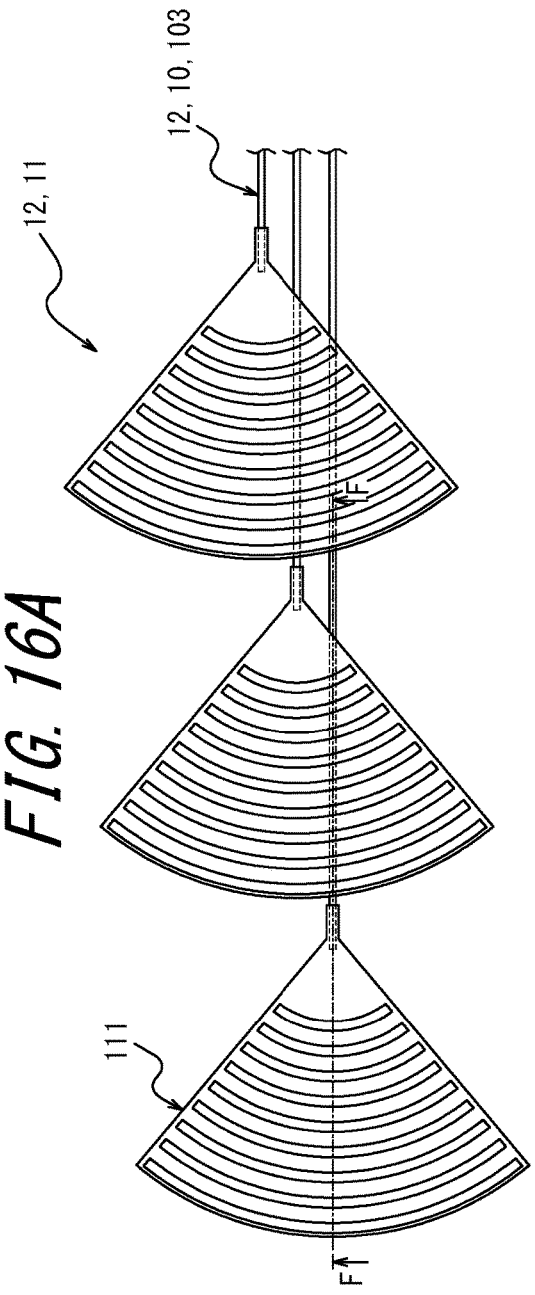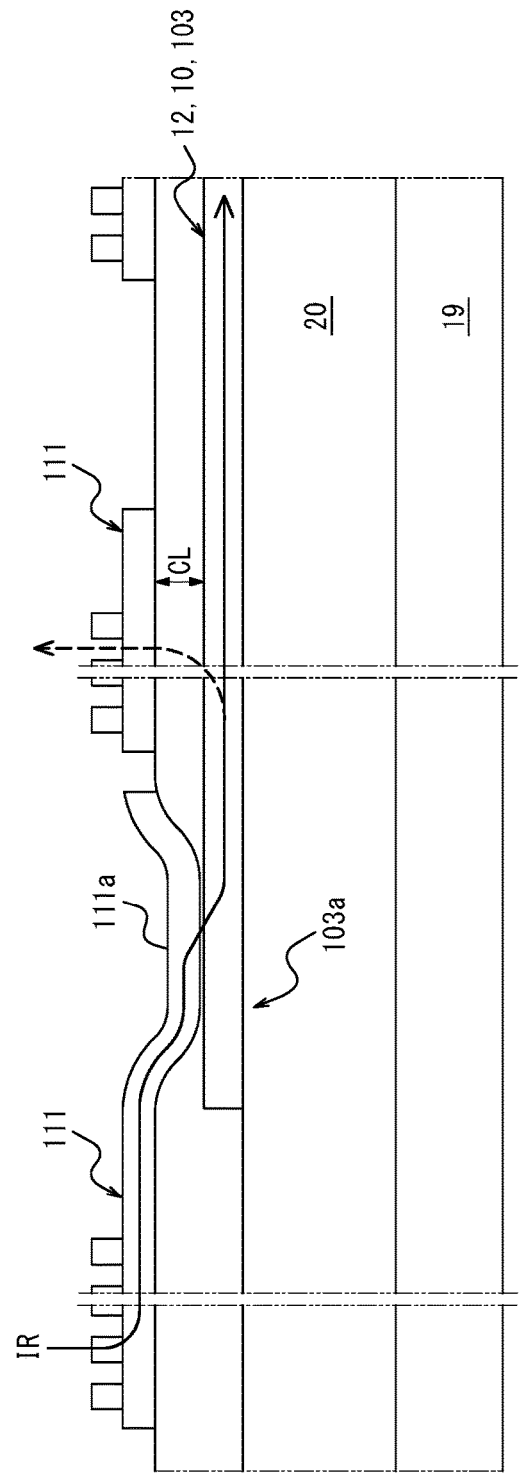

FIG. 17
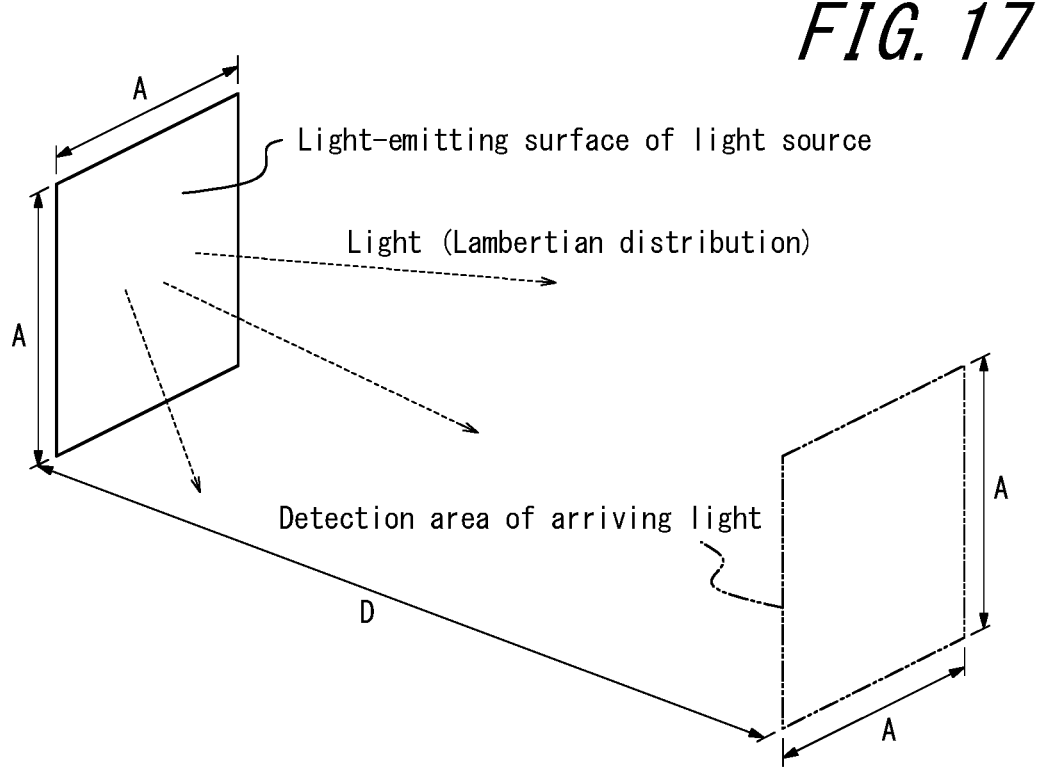
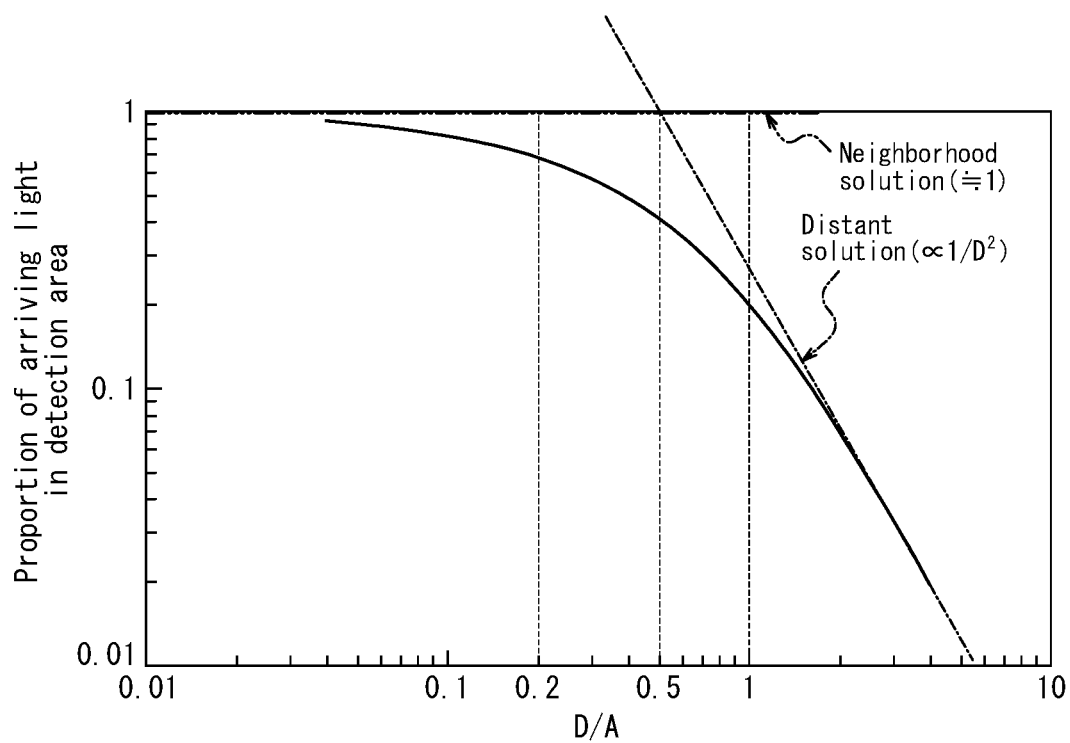

Several hundred μm

OPTICAL DENSITY MEASURING APPARATUS AND OPTICAL WAVEGUIDE

CROSS-REFERENCE TO RELATED APPLICATIONS

The present application claims priority to and the benefit of Japanese Patent Application No. 2019-057300 filed on Mar. 25, 2019 and Japanese Patent Application No. 2020-011747 filed on Jan. 28, 2020, the entire contents of which are incorporated herein by reference.

TECHNICAL FIELD

The present disclosure relates to an optical density measuring apparatus and an optical waveguide.

BACKGROUND

Light propagating through a structure, such as a thin film formed by crystal or the like, travels while repeatedly being totally reflected at the interface with the outside of the structure when the refractive index of the material forming the structure is greater than the refractive index of the material outside of the structure. When the light propagating through the structure is totally reflected at the interface, the light extends to the outside, which has a smaller refractive index. Such an extension is referred to as an evanescent wave (see FIG. 18). An evanescent wave EW may be absorbed by a substance 52 adjacent to the structure 51 while light L is propagating. This enables detection and identification of the substance 52 in contact with the structure 51 based on a change in the intensity of the light L propagating through the structure 51. An analytical method using the above-described principle of evanescent waves EW is referred to as an attenuated total reflection (ATR) method and is used in chemical composition analysis of the substance 52, for example. Typically, infrared radiation is used as the light to be propagated. Substances have the property of selectively absorbing infrared radiation of particular wavelengths. A substance to be measured can therefore be analyzed or sensed by propagation of infrared radiation in accordance with the absorption spectrum of the substance.

Patent literature (PTL) 1 proposes an optical waveguide sensor in which the ATR method is applied to a sensor. This optical waveguide sensor has a core layer formed on a substrate, allows light to pass through the core layer, and uses an evanescent wave to detect a substance in contact with the core layer.

In a sensor using the ATR method, a location for introducing light from a light source into the core layer of the optical waveguide and a location for extracting the light from the core layer of the optical waveguide towards a photodetector are necessary. A diffraction grating for bending the optical axis of the light is therefore often provided between the light source and the optical waveguide and between the photodetector and the optical waveguide. As the loss of light at the diffraction grating is smaller at this time, the strength of the signal detected by the photodetector increases, thereby increasing the sensitivity as a sensor.

CITATION LIST

Patent Literature

PTL 1: JP2005-300212A

SUMMARY

A light source (light-emitting element) such as an infrared LED that can be used in a sensor based on the ATR method often has a light-emitting surface with a relatively large area, such as 100 μm×100 μm, or even a very large area of several mm×several mm. To increase the light introduction efficiency and light extraction efficiency, the diffraction grating is also required to function at approximately the same size as the light receiving/emitting surfaces of the light source and photodetector that are used.

From this perspective, the size of the diffraction grating needs to be made very large to match the light-emitting surface so that the light-emitting element of the light source and the diffraction grating can be approximately the same size. Even if such a very large diffraction grating is formed, however, highly efficient coupling with the light-emitting element might not be possible (it might not be possible to raise the light introduction efficiency).

It could be helpful to provide an optical density measuring apparatus and an optical waveguide capable of coupling the light-emitting element and the optical waveguide highly efficiently.

After extensive research on how to solve the aforementioned problem, we discovered that when one diffraction grating 53 larger than the light-emitting surface EF of the light-emitting element is formed, as illustrated in FIG. 19A, the light that is received at the distal portion of the diffraction grating 53, opposite the side connected to the light propagation unit, does not all propagate to the connection side of the diffraction grating 53. Rather, a portion of this light is re-irradiated from inside the diffraction grating to the outside of the core layer at the middle section of the diffraction grating 53, as illustrated in FIG. 19B. Furthermore, we discovered that since such re-irradiation occurs, the aforementioned problem can be solved by forming a plurality of diffraction gratings instead of forming one diffraction grating that is equivalent in size to the light-emitting surface of the light-emitting element.

The features of the present disclosure are as follows.

One of the disclosed aspects provides an optical density measuring apparatus for measuring density of a gas or a liquid to be measured. The optical density measuring apparatus includes a light source capable of irradiating light into a core layer; a detector capable of receiving light propagated through the core layer; and an optical waveguide. The optical waveguide includes a substrate and the core layer, which includes a light propagation unit and a first diffraction grating unit configured to receive the light from the light source and guide the light to the light propagation unit, the light propagation unit including a propagation channel capable of propagating light in an extending direction of the light propagation unit. The first diffraction grating unit is disposed near to and facing a light-emitting surface of the light source. The first diffraction grating unit includes a plurality of first diffraction gratings, and at least two first diffraction gratings among the plurality of first diffraction gratings are configured to receive light emitted from a same light-emitting surface of the light source.

Another one of the disclosed aspects provides an optical waveguide for use in an optical density measuring apparatus for measuring density of a gas or a liquid to be measured. The optical waveguide includes a substrate and a core layer including a light propagation unit and a first diffraction grating unit configured to receive the light from a light source and guide the light to the light propagation unit, the light propagation unit including a propagation channel capable of propagating light in an extending direction of the light propagation unit. The first diffraction grating unit is disposed near to and facing a light-emitting surface of the light source. The first diffraction grating unit includes a plurality of first diffraction gratings, and at least two first diffraction gratings among the plurality of first diffraction gratings are configured to receive light emitted from a same light-emitting surface of the light source.

The present disclosure can provide an optical density measuring apparatus and optical waveguide capable of coupling a light-emitting element and an optical waveguide highly efficiently.

BRIEF DESCRIPTION OF THE DRAWINGS

In the accompanying drawings:

FIG. 16A is a plan view, and FIG. 16B is a cross-sectional view, taken along line F-F in FIG. 16A, to illustrate a portion of a first diffraction grating unit and propagation channels of an optical waveguide used in the optical density measuring apparatus of the fourth embodiment of the present disclosure;

FIG. 17 illustrates the proximity arrangement in the optical density measuring apparatus according to the present disclosure;

DETAILED DESCRIPTION

Figure 1:
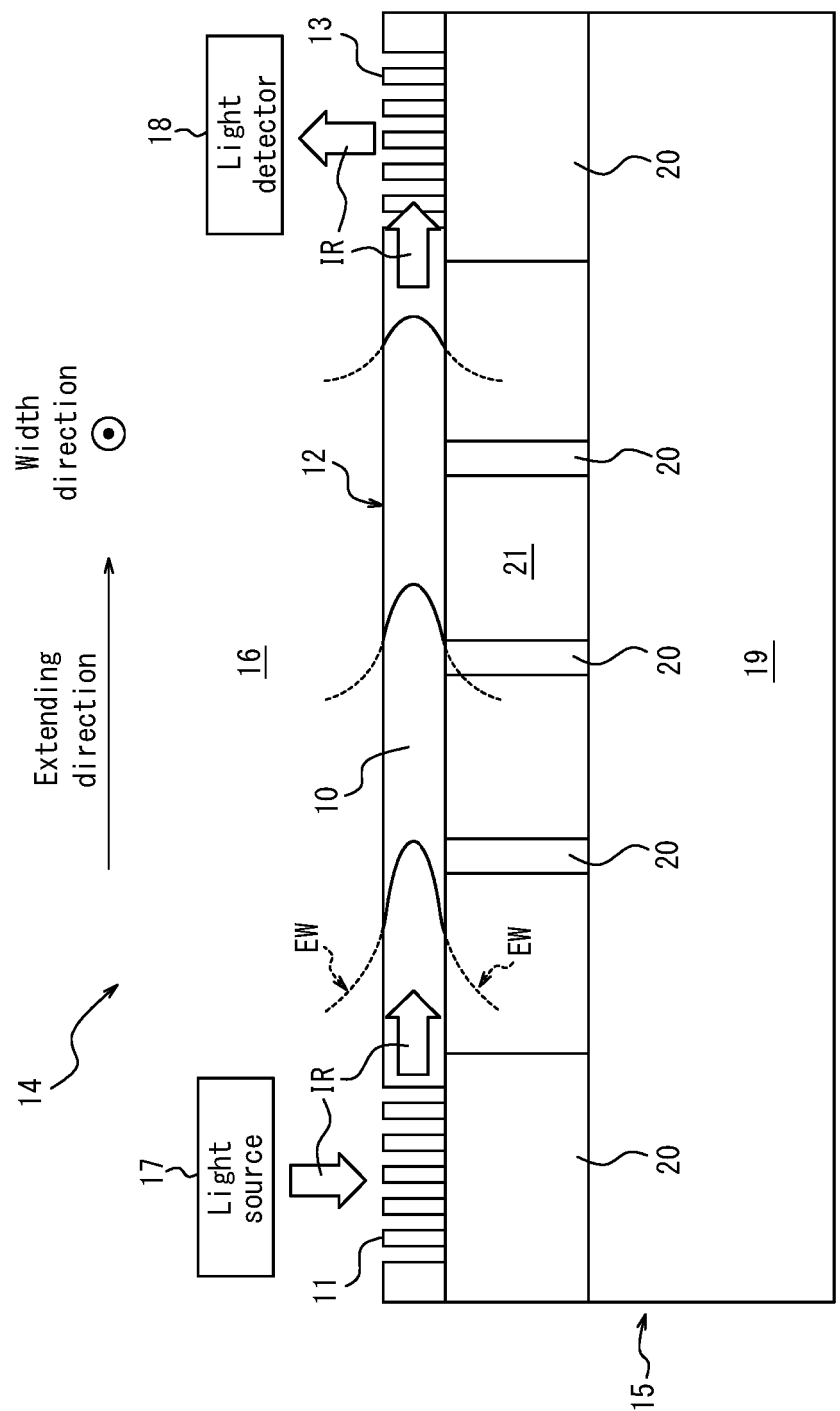
FIG. 1 illustrates the schematic configuration of an optical density measuring apparatus and an optical waveguide according to a first embodiment of the present disclosure.

Embodiments of the present disclosure are now described, but the following embodiments do not limit the claimed subject matter. Furthermore, not all combinations of features described in the embodiments are necessarily essential to the solution to the problem of the present disclosure.

<Optical Density Measuring Apparatus>

An optical density measuring apparatus according to an embodiment of the present disclosure includes an optical waveguide, described below, according to an embodiment of the present disclosure, a light source capable of irradiating light into a core layer, and a detector capable of receiving light propagated through the core layer.

The constituent elements of the optical density measuring apparatus are described below with examples.

<Optical Waveguide>

An optical waveguide according to an embodiment of the present disclosure is an optical waveguide used in an optical density measuring apparatus that measures the density of a gas or a liquid to be measured. The optical waveguide includes a substrate and a core layer, which includes a light propagation unit and a first diffraction grating unit configured to receive the light from the light source and guide the light to the light propagation unit.

The light propagation unit includes a propagation channel capable of propagating light in an extending direction of the light propagation unit. The first diffraction grating unit is disposed near to and facing a light-emitting surface of the light source. The first diffraction grating unit includes a plurality of first diffraction gratings, and at least two first diffraction gratings among the plurality of first diffraction gratings are configured to receive light emitted from the same light-emitting surface of the light source. Furthermore, the optical waveguide can include a second diffraction grating unit configured to take in light from the light propagation unit and output the light to a detector.

As a result of the first diffraction grating unit having a plurality of first diffraction gratings, and at least two first diffraction gratings among the plurality of first diffraction gratings receiving light emitted from the same light-emitting surface of the light source, the optical waveguide according to the present embodiment can very efficiently couple the light-emitting element and the optical waveguide. If a diffraction grating unit could have one very large diffraction grating matching the light-emitting surface with an area of 100 μm×100 μm or more, for example, a portion of the light that is received at the distal side opposite the connection side of the diffraction grating to the light propagation unit is re-irradiated, from within the diffraction grating, to the outside of the core layer in the middle of the diffraction grating. By contrast, at least two first diffraction gratings among the plurality of first diffraction gratings receive light emitted from the same light-emitting surface of the light source in the optical waveguide according to the present embodiment. This can suppress the aforementioned negative effect occurring when one diffraction grating that is larger than the light-emitting surface of the light-emitting element is formed. In other words, the light-emitting element and the optical waveguide can be coupled using two or more first diffraction gratings with a smaller size than the size of the light-emitting surface, thereby achieving highly efficient coupling.

In the present embodiment, the extending direction refers to at least one direction in which an object extends. For example, in a three-dimensional structure, the path of shortest distance from one end to another end (or any one point to any other point) while in contact with the three-dimensional structure is the extending direction. Alternatively, the direction that minimizes the change in cross-sectional area from one end to another end (or any one point to any other point) may be the extending direction. The extending direction need not be linear and may be a curve.

Stating that the first diffraction grating unit guides light towards the light propagation unit (i.e. that the light propagation unit takes in light from the first diffraction grating unit) or that the light propagation unit guides light towards the second diffraction grating unit as described below (i.e. that the second diffraction grating unit takes in light from the light propagation unit) means that as long as light can propagate between the first/second diffraction gratings of the first/second diffraction grating units and the propagation channels of the light propagation unit, the form in which these units are connected is not limited. For example, these units may be continuously connected by the same material (the same crystal state) without gaps or may be optically continuous. Examples of being optically continuous include these units being discontinuous by being formed from different materials (including the case of the same element having different crystal states) but being optically continuous as a result of being positioned coaxially, and these units being discontinuous by not being positioned coaxially (being disjoint) but being coupled by an evanescent wave, as in a directional coupler. A directional coupler refers to an optically coupled state by using an evanescent wave such that the travel direction of light does not change during a transition when the light transitions from one side to another. In the present disclosure, a state in which light can be guided and taken in between the diffraction grating unit and the light propagation unit is also simply referred to as (the diffraction gratings of) the diffraction grating unit and (the propagation channels of) the light propagation unit being connected.

Furthermore, all of the first diffraction gratings may be configured to receive light emitted from the same light-emitting surface of the light source. Stating that at least two first diffraction gratings receive light emitted by the same light-emitting surface of the light source refers to that, in plan view, at least two first diffraction gratings among the plurality of first diffraction gratings are located within a range yielded by projecting the range considered to be the same light-emitting surface of the light source onto the first diffraction grating unit in a direction orthogonal to the light-emitting surface. Even if the at least two first diffraction gratings are not entirely located within this range, it suffices for at least the below-described intake unit (uneven portion) of the first diffraction gratings to be located within this range. The range considered to be the same light-emitting surface is not necessarily limited to one light-emitting surface. In the case of a plurality of light-emitting surfaces, the total range of the plurality of light-emitting surfaces is considered one light-emitting surface when the light outputted from each light-emitting surface is synchronously controlled by a common drive system. The light-emitting surface of the light source is the portion of the surface, from which light is emitted, that can come into contact with the gas or liquid to be measured.

Furthermore, light emitted from each point within the same light-emitting surface may have an equivalent wavelength dispersion. In other words, light in the same wavelength band may be emitted from each point within the same light-emitting surface. Furthermore, the spectrum yielded by combining the selected wavelength spectrum of each of the first diffraction gratings may be unimodal. When the spectrum yielded by combining the selected wavelength spectrum of each of the first diffraction gratings is unimodal, light of the same wavelength band emitted from each point within the same light-emitting surface can be taken in efficiently at the point where each first diffraction grating is located. In other words, light of the same wavelength emitted from each point within the same light-emitting surface can be taken in over a wide range of the first diffraction grating unit. The wavelength range that is unimodal may, for example, be a wavelength in a vacuum of 2 μm or more to less than 12 μm. In a spectrum approximating the spectrum yielded by combining the selected wavelength of each of the first diffraction gratings at a wavelength resolution of 0.1 μm or less, a variation of 10% or less to the peak value of the combined spectrum is considered to be unimodal.

Furthermore, the optical waveguide according to an embodiment of the present disclosure preferably further includes a second diffraction grating unit configured to take in light from the light propagation unit and output the light to the detector, and the second diffraction grating unit preferably includes at least one second diffraction grating. The light propagation unit of the optical waveguide preferably includes at least one linear propagation channel configured to take in light received by one of the first diffraction gratings, propagate the light, and guide the light to one of the second diffraction gratings.

When the light propagation unit includes at least one linear propagation channel in the optical waveguide according to the present embodiment, then as described below, the loss of light that would occur upon combining and splitting in a branched propagation channel can be prevented, and light can be used more efficiently. From the same perspective, the entire light propagation unit is preferably a linear propagation channel.

The optical waveguide according to an embodiment of the present disclosure may include a branched propagation channel, described below, instead of or in addition to the above-described linear propagation channel. Specifically, the light propagation unit in the optical waveguide may include at least one branched propagation channel including a linear portion positioned in a central region of the branched propagation channel, a plurality of first diffraction grating side portions configured to take in the light received by the plurality of first diffraction gratings, a converging portion where propagation channels from the plurality of first diffraction grating side portions to the linear portion converge, and a second diffraction grating side portion configured to guide light propagated through the linear portion towards the second diffraction grating unit.

When the light propagation unit includes at least one branched propagation channel in the optical waveguide according to the present embodiment, the propagation channels of the light propagation unit do not become complex even if many first diffraction gratings are provided, and the light propagation unit can be made more compact. The light propagation unit may include just one branched propagation channel.

The constituent elements of the optical waveguide are described below with examples.

<<Core Layer>>

In the present embodiment, the core layer includes a light propagation unit and a first diffraction grating unit configured to receive light from a light source and guide the light to the light propagation unit. The light propagation unit includes a propagation channel capable of propagating light in an extending direction of the light propagation unit. The core layer can further include a second diffraction grating unit configured to take in light from the light propagation unit and output the light to the detector. The second diffraction grating unit includes at least one second diffraction grating.

Any material may be used in the core layer. Examples of materials included in the core layer include monocrystalline silicon and polycrystalline silicon, amorphous silicon, silicon nitride, silicon germanium, germanium, gallium arsenide, indium phosphide, indium antimony, indium gallium arsenide, indium gallium phosphide, indium fluoride, diamond, sapphire, lithium niobate, and chalcogenide glass. The core layer may be a single-layered film or may be a multilayer film.

The first diffraction grating unit and the light propagation unit may be formed from different materials. In this case, the material forming the light propagation unit is preferably monocrystalline silicon, and the material forming the first diffraction grating unit preferably includes polycrystalline silicon or amorphous silicon. Silicon is the most common material, and this configuration can reduce propagation loss in the light propagation unit and easily increase the degree of freedom for processing the first diffraction grating unit.

Furthermore, a cross-section perpendicular to the extending direction of the core layer at an arbitrary position along the extending direction may, for example, have a shape in which the distance from the center of the core layer to the outer surface in the cross-section varies, such as a rectangle, or a shape in which the distance from the center of the core layer to the outer surface in the cross-section does not vary, i.e. a circle.

In the present embodiment, at least a portion of the core layer may be exposed or covered by a thin film. Consequently, the portion of the core layer that is exposed or covered can come into direct contact with the gas or liquid to be measured, or can come into contact with the gas or liquid to be measured via the thin film. This enables interaction between the evanescent wave and the gas or liquid to be measured, thereby enabling measurement of the density of the gas or liquid to be measured. In the present embodiment, the thin film is preferably thinner than ¼ of the wavelength, in a vacuum, of the light propagating through the core layer.

In the present embodiment, the light propagating through the core layer may be infrared radiation serving as an analog signal. Infrared radiation serving as an analog signal does not refer to determining the change in the energy of light to be one of two values, i.e. 0 (low level) or 1 (high level), but rather to a signal that carries the amount of change in the energy of light. The optical waveguide according to the present embodiment can therefore be used in sensors or analysis equipment. In this case, the wavelength of the infrared radiation in a vacuum may be from 2 μm or more to less than 12 μm. This is a wavelength band absorbed by gases ($CO_2$, CO, NO, $N_2O$, $SO_2$, $CH_4$, $H_2O$, $C_2H_6O$, and the like) that are typically floating in the environment. Accordingly, the optical waveguide according to each embodiment can be used as a gas sensor.

The core layer may include a curved portion. This enables the aspect ratio of the contour of the core layer to approach 1 in plan view of the entire core layer, enabling miniaturization of the optical waveguide and the optical density measuring apparatus.

<<<Light Propagation Unit>>>

In the present embodiment, the light propagation unit has a propagation channel capable of propagating light in the extending direction of the light propagation unit. A cross-section perpendicular to the extending direction of the propagation channel at an arbitrary position along the extending direction may, for example, have a shape in which the distance from the center of the core layer in the cross-section to the outer surface varies, such as a rectangle, or a shape in which the distance from the center of the core layer in the cross-section to the outer surface does not vary, i.e. a circle. The light propagation unit in the present embodiment can include at least one branched propagation channel that functions to combine (converge) and split (branch) light. A cross-section perpendicular to the extending direction of the propagation channel at any position along the extending direction in the converging portion and an arbitrary branching portion within the branched propagation channel may have a different shape from the propagation channel other than the converging portion and the branching portion.

The propagation channel in the present embodiment may have a substantially uniform film thickness in the extending direction. A substantially uniform film thickness refers, for example, to the height difference in the film thickness being 200 nm or less. The propagation channel may have a portion with a different width along the extending direction. When the light propagation unit includes a plurality of propagation channels, the propagation channels may have different film thicknesses and widths. The film thickness of the core layer may or may not be uniform throughout the light propagation unit.

In the present embodiment, the light propagation unit may include at least one linear propagation channel configured to take in light received by one of the first diffraction gratings, propagate the light, and guide the light to one of the second diffraction gratings. In this case, the light propagation unit includes at least one linear propagation channel. The remaining propagation channels may take any form. The light propagation unit may include only one linear propagation channel, or all of the propagation channels of the light propagation unit may be linear propagation channels. When a plurality of linear propagation channels are included, the plurality of linear propagation channels may be aligned as parallel propagation channels between the first diffraction gratings and the second diffraction gratings.

In the present embodiment, the light propagation unit may include at least one branched propagation channel that includes a linear portion positioned in a central region of the branched propagation channel, a plurality of first diffraction grating side portions configured to take in the light received by the plurality of first diffraction gratings, a converging portion where propagation channels from the plurality of first diffraction grating side portions to the linear portion converge, and a second diffraction grating side portion configured to guide light propagated through the linear portion towards the second diffraction grating unit. Specifically, in this branched propagation channel, the linear portion positioned in the central region forms one propagation channel, and the first diffraction grating side portions on the first diffraction grating side form propagation channels for connection to the first diffraction gratings. Furthermore, the propagation channels from the first diffraction grating side portions towards the linear portion converge in the converging portion.

The number of first diffraction grating side portions included in the branched propagation channel may be the same as the number of first diffraction gratings in the first diffraction grating unit or may be only a portion thereof. The manner in which the converging portion of the branched propagation channel causes the propagation channels to converge is not restricted, as long as the light received by the plurality of first diffraction gratings can be combined and guided to the linear portion of the branched propagation channel. For example, the propagation channels of the plurality of first diffraction grating side portions may converge in stages (for example, in the case of three first diffraction grating side portions, two of the first diffraction grating side portions may converge into a propagation channel, which then converges with the other first diffraction grating side portion), or all of the first diffraction grating side portions may converge at once.

As long as the light propagation unit can guide the light propagated through the linear portion via the second diffraction grating side portion to the second diffraction grating unit, the light propagation unit may, for example, include a plurality of the second diffraction grating side portions, and a branched portion where propagation channels branch from the linear portion to the plurality of second diffraction grating side portions may be provided between the linear portion and the second diffraction grating side portions. Alternatively, the number of second diffraction grating side portions may be one, the branched portion may be omitted, and the light from the linear portion may be guided through the one second diffraction grating side portion to the second diffraction grating unit. When the branched portion is provided, the number of second diffraction grating side portions may be the same as or different from the number of first diffraction grating side portions. Furthermore, when the branched portion is provided, the propagation channels may branch in any manner enabling light from the linear portion to be split and guided to the plurality of second diffraction gratings. For example, the propagation channels may branch in stages in the branching portion or may branch to all of the second diffraction grating side portions at once.

<<<First Diffraction Grating Unit, Second Diffraction Grating Unit>>>

In the present embodiment, the first diffraction grating unit receives light from a light source and guides the light to the light propagation unit. The first diffraction grating unit includes a plurality of first diffraction gratings, and at least two first diffraction gratings among the plurality of first diffraction gratings receive light emitted from the same light-emitting surface of the light source. In the present embodiment, the core layer may include a second diffraction grating unit that includes at least one second diffraction grating configured to take in light from the light propagation unit and output the light to the detector.

In the present embodiment, the first diffraction grating may include a light intake unit that takes light from the outside into the core layer, and the second diffraction grating may include a light extraction unit that extracts light to outside the core layer. In the present embodiment, the light intake unit and light extraction unit may be portions where an unevenness is formed on the surface over a particular period (or a plurality of periods). Alternatively, in a cross-sectional view of the optical waveguide including a plane having recessed portions and protruding portions, the recessed portions of the unevenness may become deep grooves, separating the core layer. In this configuration, the protruding portions are formed discontinuously.

The light intake unit and light extraction unit can be provided so that, in plan view, unevenness is formed in parallel patterns extending as a line or an ark, but the unevenness may extend in any shape.

The diffraction grating may have any shape in plan view in the present embodiment. For example, the shape may have a portion that widens from the connection side to the distal side, with the tip being the apex of the first diffraction grating and the second diffraction grating on the side connected to the light propagation unit. Specifically, while the shape also depends on the light intake unit and the light extraction unit of the first diffraction grating and the second diffraction grating, the shape may be a fan centered on the apex of the first diffraction grating and the second diffraction grating, a triangle centered on the apex of the first diffraction grating and the second diffraction grating (such as an isosceles triangle), or a shape with a first portion having the apex as the tip and widening from the apex towards the intake unit or the extraction unit and a second portion with an arbitrary shape, such as a rectangle, continuous with this first portion. The shape of the diffraction grating preferably has line symmetry relative to a virtual line from the connection side towards the distal side and preferably has a shape that does not decrease in width from the apex towards the intake unit or the extraction unit.

The side of the first diffraction grating and the second diffraction grating connected to the light propagation unit is also referred to as the connection side of the diffraction grating, and the distal side of the first diffraction grating and the second diffraction grating opposite the side connected to the light propagation unit is also referred to as the distal side of the diffraction grating.

In the present embodiment, at least one first diffraction grating among the plurality of first diffraction gratings can have a maximum diffraction grating length of $20\lambda$ or less, preferably $10\lambda$ or less, more preferably $5\lambda$ or less. The light-emitting element and the optical waveguide can be coupled more efficiently by the maximum diffraction grating length of at least one first diffraction grating being $20\lambda$ or less. The aforementioned λ represents the average wavelength, in a vacuum, of the light propagating through the core layer.

Specifically, in a diffraction grating that is larger than the light-emitting surface of the light-emitting element, for example, a portion of the light that is received at the distal side opposite the side where the diffraction grating is connected to the light propagation unit is re-irradiated to the outside of the core layer from within the diffraction grating. After extensively researching this phenomenon, we discovered that this re-irradiation is based on the principle that wavelength selectivity in the diffraction grating improves as the diffraction grating length is greater. In other words, if the diffraction grating length is too long, a more singular wavelength is selected, and even light that slightly differs from the selected wavelength ends up being re-irradiated outside the core layer. The selected wavelength band thus grows narrower as the diffraction grating length is longer, approaching a line spectrum. Based on these findings, we discovered that setting the maximum diffraction grating length to 20λ or less for the first diffraction grating allows selection of an effective wavelength band for the optical density measuring apparatus. In an optical density measuring apparatus that can use the optical waveguide of the present embodiment, density is measured using the absorption of light by the substance to be measured. The light absorption wavelength range of a substance has a certain width, however, and is not strictly a single wavelength. For example, a representative absorption wavelength of $CO_2$, which is a gas floating in the environment, is distributed over a relatively wide range of approximately 4.20 μm to 4.35 μm. In other words, if light is excessively selected to the point of a strictly single wavelength, a wavelength region effective for density measurement is wasted. This is not preferable for an optical density measuring apparatus. Hence, setting the maximum diffraction grating length of at least one first diffraction grating among the plurality of first diffraction gratings in the present embodiment to 20λ or less can suppress unnecessary re-irradiation of light introduced to the diffraction grating (excessive wavelength selection), and as an optical waveguide, can further increase the efficiency of coupling between the light-emitting element and the optical waveguide.

The maximum diffraction grating length of at least one first diffraction grating is preferably 10λ or less, more preferably 5λ or less. When measuring the density of $CO_2$, for example, which is a gas floating in the environment, the adoption of these ranges can suppress unnecessary re-irradiation (excessive wavelength selection) while selecting a wavelength band useful for the optical density measuring apparatus. As an optical waveguide used in an optical density measuring apparatus, the efficiency of coupling between the light-emitting element and the optical waveguide can thereby be further increased.

Here, the diffraction grating length of the first diffraction grating is measured starting at a specific point in the extending direction of the wall, among the walls dividing the recessed portions or protruding portions of the intake unit of the above-described first diffraction grating, that is positioned closest to the connection side to the light propagation unit. The diffraction grating length indicates the length from this starting point towards the distal side, along a virtual line extending in a direction orthogonal to the extending direction of the wall from the specific point, to the wall positioned closest to the distal side along the virtual line (the wall, among the walls dividing the recessed portions or protruding portions of the intake unit, that is positioned closest to the distal side). The diffraction grating length of the first diffraction grating can change depending on the shape of the intake unit of the first diffraction grating. That is, the length from the aforementioned starting point can change depending on the shape of the intake unit. The maximum diffraction grating length of the first diffraction grating indicates the longest length among the aforementioned diffraction grating lengths.

The minimum diffraction grating length of the first diffraction grating in the present embodiment is preferably 1λ or more. The diffraction grating length of 1λ is the minimum necessary distance for selecting a particular wavelength band with respect to the light emitted by the light source.

The at least one first diffraction grating, among the plurality of first diffraction gratings, that has the maximum diffraction grating length of 20λ or less is preferably positioned within the range yielded by projecting the range of the light-emitting surface of the light source. The at least one first diffraction grating that has the minimum diffraction grating length of 1λ or more is also preferably positioned within the range yielded by projecting the range of the light-emitting surface of the light source.

The number of first diffraction gratings in the first diffraction grating unit in the present embodiment can be 4 or more, preferably 8 or more, more preferably 16 or more. The light-emitting element and the optical waveguide can thereby be coupled more efficiently.

The first diffraction gratings in the first diffraction grating unit can be arranged periodically in plan view in the present embodiment. The plurality of first diffraction gratings may, for example, be periodically arranged to face in alternate directions. The arrangement of the first diffraction gratings in the first diffraction grating unit in plan view may be expressed as one of the space groups p2, p2mm, p2mg, p2gg, and c2mm. This arrangement allows the area to be used efficiently.

Furthermore, at least two first diffraction gratings among the plurality of first diffraction gratings in the first diffraction grating unit can be connected to the light propagation unit in opposite directions in plan view of the optical waveguide. Specifically, at least two first diffraction gratings are connected to the light propagation unit in the horizontal direction, or the vertical direction, in plan view of the plurality of first diffraction gratings. In other words, the connection directions of at least two first diffraction gratings to the light propagation unit are 180 degrees apart. The arrangement of the first diffraction gratings in the first diffraction grating unit in plan view of the optical waveguide may be expressed as one of the space groups p1, pm, pg, cm in addition to one of the space groups p2, p2mm, p2mg, p2gg, and c2mm. This arrangement allows the area to be used efficiently.

In the present embodiment, the structure of the second diffraction grating unit may be identical to the structure of the first diffraction grating unit or a modification to the structure of the first diffraction grating unit. A modification to the structure of the first diffraction grating unit refers to the shape, configuration, arrangement, and the like, of the second diffraction gratings included in the second diffraction grating unit being a form with rotation, enlargement, reduction, translation, line symmetry, or point symmetry relative to the shape, configuration, arrangement, and the like, of the first diffraction gratings included in the first diffraction grating unit. A difference of 1λ or less, preferably 1 μm or less, between these structures is tolerated. When the structure of the second diffraction grating unit is the same as the structure of the first diffraction grating unit or a modification to the structure of the first diffraction grating unit, the wavelength selectivity in the first diffraction grating unit and the wavelength selectivity in the second diffraction grating unit can be made substantially equivalent. This can avoid light loss occurring when the wavelength selectivities differ between the first diffraction grating unit and the second diffraction grating unit.

<<Substrate>>

The substrate in the present embodiment may be any substrate on which the core layer can be formed. The below-described support can also be formed on the substrate. Specific examples of the substrate include a silicon substrate and a GaAs substrate.

<<Support>>

Any support may be provided in the present embodiment. The support connects at least a portion of the substrate and at least a portion of the core layer. The support may be any material capable of joining the substrate and the core layer but is preferably a material that has a smaller refractive index than the core layer with respect to light of any wavelength or light propagating through the core layer. Examples of the material forming the support include $SiO_2$. The support is not an essential element in the present disclosure. The core layer may be joined to the substrate by the support, or the core layer may be formed directly on the substrate. The support may be discontinuous, and at least a portion of the core layer may be floating, without being joined to the support. In other words, a space is formed between the substrate and the core layer except in a region where the support is provided in an optical waveguide configured in this way. The extent of the interaction between the evanescent wave and the substance to be measured can be increased by causing a portion of the core layer to be free-standing. This can increase sensor sensitivity.

An example of a method of forming the support in the present embodiment is to etch a buried oxide (BOX) layer ($SiO_2$ layer) of a silicon on insulator (SOI) substrate, thereby forming a structure in which the BOX layer supports the core layer (Si layer) with respect to the substrate (Si layer).

<Light Source>

The light source may be any light source capable of causing light to enter the core layer. An incandescent bulb, a ceramic heater, a micro electro mechanical systems (MEMS) heater, an infrared light emitting diode (LED), or the like can be used as the light source in the case of using infrared radiation to measure a gas. In other words, an incoherent light source may be used. The light source may be arranged in any way that allows optical connection. For example, the light source may be arranged adjacent to the optical waveguide in the same body as the optical waveguide or may be arranged in a separate body that is a certain distance from the optical waveguide. A mercury lamp, an ultraviolet LED, or the like can be used as the light source in the case of using ultraviolet rays to measure a gas.

The light propagating through the core layer of the optical waveguide provided in the optical density measuring apparatus may be infrared radiation serving as an analog signal. Infrared radiation serving as an analog signal does not refer to determining the change in the energy of light to be one of two values, i.e. 0 (low level) or 1 (high level), but rather to a signal that carries the amount of change in the energy of light. The optical density measuring apparatus can therefore be applied to sensors or to analysis apparatuses. In this case, the wavelength of the infrared radiation in a vacuum may be from 2 μm or more to less than 12 μm. This is a wavelength band absorbed by gases ($CO_2$, CO, NO, $N_2O$, $SO_2$, $CH_4$, $H_2O$, $C_2H_6O$, and the like) that are typically floating in the environment. Consequently, the optical density measuring apparatus of the present embodiment can be used as a gas sensor.

The light-emitting surface of the light source in the present embodiment can be disposed near to and facing the first diffraction grating unit (in other words, the first diffraction grating unit can be placed near to and facing the light-emitting surface of the light source). In this way, the proportion of the light that reaches the first diffraction grating unit from the light emitted from the light source towards the first diffraction grating unit can be increased (when viewing the first diffraction grating unit from the light source, the solid angle created by the first diffraction grating unit widens). Light can therefore be introduced efficiently into the optical waveguide.

"Near" refers to a length that is 1 mm or less, or $\sqrt{Ss}$ or less where Ss is the area of the same light-emitting surface of the light source. This length is preferably 500 μm or less, or $0.5 \times \sqrt{Ss}$ or less, and is more preferably 200 or less, or $0.2 \times \sqrt{Ss}$ or less. This length refers to the length measured in the thickness direction of the optical waveguide from the bottom edge of the light-emitting surface of the light source on the optical waveguide side to the first diffraction grating unit positioned closest to the light source. Other members, such as a lens or optical fiber, are preferably not present between the light-emitting surface of the light source and the first diffraction grating unit, and the light outputted from the light-emitting surface preferably reaches the first diffraction grating unit directly after passing through a slight space. This allows the optical density measuring apparatus to be produced at a low cost.

The ratio of the total area of the first diffraction gratings covered by the light-emitting surface of the light source to the area of the light-emitting surface may be 30% or more in the present embodiment. This enables the light-emitting element and the optical waveguide to be coupled highly efficiently.

This ratio is preferably 60% or higher. This enables the light-emitting element and the optical waveguide to be coupled even more efficiently.

The area of the first diffraction gratings covered by the light-emitting surface refers to the area of the intake unit of the first diffraction gratings located in the range yielded by projecting the range considered to be the same light-emitting surface of the light source onto the first diffraction grating unit along a direction orthogonal to the light-emitting surface.

<Detector>

The detector may be any detector capable of detecting light that has propagated through the core layer of the optical waveguide. A thermal infrared sensor such as a pyroelectric sensor, a thermopile, or a bolometer; a quantum infrared sensor such as a diode or a phototransistor; or the like can be used as the detector in the case of using infrared radiation to measure a gas. A quantum ultraviolet sensor, such as a diode or a phototransistor, or the like can be used as the detector in the case of using ultraviolet rays to measure a gas.

The detector in the present embodiment can be disposed near to and facing the second diffraction grating unit (in other words, the second diffraction grating unit can be placed near to and facing the detector). In this way, the proportion of the light that reaches the detector from the light outputted from the second diffraction grating unit towards the detector can be increased (when viewing the detector from the second diffraction grating unit, the solid angle created by the detector widens). Light can therefore be introduced efficiently into the detector.

"Near" refers to a length that is 1 mm or less, or $\sqrt{Sd}$ or less where Sd is the area of the light-receiving surface of the detector. This length is preferably 500 μm or less, or $0.5\times\sqrt{Sd}$ or less, and is more preferably 200 μm or less, or $0.2\times\sqrt{Sd}$ or less. This length refers to the length measured in the thickness direction of the optical waveguide from the bottom edge of the detector on the optical waveguide side to the second diffraction grating unit positioned closest to the detector. Other members, such as a lens or optical fiber, are preferably not present between the second diffraction grating unit and the detector, and the light outputted from the second diffraction grating unit preferably reaches the detector directly after passing through a slight space. This allows the optical density measuring apparatus to be produced at a low cost.

[Optical Density Measuring Apparatus According to an Embodiment of the Present Disclosure]

An optical density measuring apparatus according to an embodiment of the present disclosure is described with reference to FIG. 1.

An optical density measuring apparatus 14 of the present embodiment includes an optical waveguide 15 of the present embodiment, described below, a light source 17 capable of irradiating light into a core layer 12, and a light detector (example of the detector) 18 capable of receiving light propagated through the core layer 12. The optical density measuring apparatus 14 further includes a second diffraction grating unit 13 that takes in light from a light propagation unit 10 and outputs the light to the light detector 18.

In greater detail, the optical density measuring apparatus 14 of the present embodiment is obtained by first manufacturing the below-described optical waveguide 15 according to an embodiment of the present disclosure. Subsequently, the light source 17 is installed to be capable of irradiating infrared radiation IR onto a first diffraction grating unit 11 (grating coupler) of the optical waveguide 15, and the light detector 18 is disposed to be capable of receiving the infrared radiation IR emitted from a second diffraction grating unit 13 (grating coupler) of the optical waveguide 15, as illustrated in FIG. 1.

In the optical density measuring apparatus 14 of the present embodiment, the first diffraction grating unit 11 is disposed near to and facing the light-emitting surface of the light source 17. Specifically, the length measured in the thickness direction of the optical waveguide 15 from the bottom edge of the light-emitting surface of the light source 17 on the optical waveguide side to the first diffraction grating unit 11 positioned closest to the light source 17 is 1 mm or less, or $\sqrt{Ss}$ or less where Ss is the area of the same light-emitting surface of the light source 17. This length is preferably 500 μm or less, or $0.5\times\sqrt{Ss}$ or less, and is more preferably 200 μm or less, or $0.2\times\sqrt{Ss}$ or less. When this length is thus 1 mm or less, or $\sqrt{Ss}$ or less, the proportion of the light that reaches the first diffraction grating unit 11 from the light emitted from the light source 17 towards the first diffraction grating unit 11 can be increased (when viewing the first diffraction grating unit 11 from the light source 17, the solid angle created by the first diffraction grating unit 11 widens). Light can therefore be introduced efficiently into the optical waveguide 15.

For these reasons, no lower limit is placed on the aforementioned length, and the light-emitting surface of the light source 17 may be in contact with the first diffraction grating unit 11. To appropriately manufacture the optical density measuring apparatus 14, however, the aforementioned length is preferably 3 μm or more. A lens or optical fiber is not present between the light-emitting surface of the light source 17 and the first diffraction grating unit 11, and the light outputted from the light-emitting surface reaches the first diffraction grating unit 11 directly after passing through a slight space of the aforementioned length. This allows the optical density measuring apparatus to be produced at a low cost.

The aforementioned length of the near arrangement is now described in detail. The results of numerically calculating the proportion of arriving light when the aforementioned length was changed in an optical simulation are indicated in FIG. 17 to illustrate the aforementioned appropriate length. FIG. 17 indicates the proportion of light that reaches the first diffraction grating unit among light emitted from the same light-emitting surface of the light source as a function of D/A, where the shape of the same light-emitting surface of a Lambertian light source is assumed to be a square with sides of length A (i.e. the area of the same light-emitting surface is $A^2$), and the aforementioned length is D. The area of the first diffraction grating unit that receives light emitted by the light source is assumed to be the same as the area of the same light-emitting surface of the light source. As illustrated in FIG. 17, the proportion of light reaching the first diffraction grating unit is approximated by the inverse square of the length D in the region where D/A>1 (i.e. when the light source is placed far away, so that D>A). The reason is that at longer distances, the projected area created by light traveling the distance up to the first diffraction grating unit increases in size proportionally to the square of the length D, and the irradiance into the first diffraction grating unit accordingly diminishes. Conversely, in the region where D/A<1 (i.e. when the light source is placed nearby, so that D<A), the proportion of arriving light is maximized and tends toward saturation as D/A grow smaller. In other words, light can be introduced to the optical waveguide 15 efficiently by setting the length D to be A (the square root of the area of the same light-emitting surface) or less, preferably 0.5 A or less, more preferably 0.2 A or less. This principle similarly holds for the second diffraction grating unit and the light-receiving surface of the light detector, described below. In this case, the area of the second diffraction grating corresponds to the above-described area of the same light-emitting surface of the light source, and the area of the light-receiving surface of the light detector corresponds to the above-described area of the first diffraction grating unit. The area of the same light-emitting surface of the light source and the area of the light-receiving surface of the light detector may each be 1 mm² or more.

In the optical density measuring apparatus 14 of the present embodiment, the second diffraction grating unit 13 is disposed near to and facing the light detector 18. Specifically, the length measured in the thickness direction of the optical waveguide 15 from the bottom edge of the light detector 18 on the optical waveguide side to the second diffraction grating unit 13 positioned closest to the light detector 18 is 1 mm or less, or $\sqrt{Sd}$ or less where Sd is the area of the light-receiving surface of the light detector 18. This length is 500 μm or less, or $0.5\times\sqrt{Sd}$ or less, and is more preferably 200 μm or less, or $0.2\times\sqrt{Sd}$ or less. When this length is thus 1 mm or less, or $\sqrt{Sd}$ or less, the proportion of the light that reaches the light detector 18 from the light outputted from the second diffraction grating unit 13 towards the light detector 18 can be increased (when viewing the light detector 18 from the second diffraction grating unit 13, the solid angle created by the light detector 18 widens). Light can therefore be introduced efficiently into the light detector 18.

For these reasons, no lower limit is placed on the aforementioned length, and the light-receiving surface of the light detector 18 may be in contact with the second diffraction grating unit 13. To appropriately manufacture the optical density measuring apparatus 14, however, the aforementioned length is preferably 3 μm or more. A lens or optical fiber is not present between the second diffraction grating unit 13 and the light detector 18, and the light outputted from the second diffraction grating unit 13 reaches the light detector 18 directly after passing through a slight space of the aforementioned length. This allows the optical density measuring apparatus to be produced at a low cost.

In the optical density measuring apparatus 14 of the present embodiment, the ratio of the total area of first diffraction gratings 111 covered by the light-emitting surface of the light source 17 to the area of the light-emitting surface is 30% or more, preferably 60% or more. This enables the light-emitting element and the optical waveguide 15 to be coupled highly efficiently.

The light source 17 in the optical density measuring apparatus 14 of the present embodiment irradiates infrared radiation with a wavelength of 2 μm or more and less than 12 μm into the core layer 12. As a result of this infrared radiation being irradiated into the core layer 12, the evanescent wave EW extending from the core layer 12 is absorbed by a substance to be measured that is present in an exterior space 16, such as $CO_2$, CO, NO, $N_2O$, $SO_2$, $CH_4$, $H_2O$, $C_2H_6O$, or another gas. The density of the substance to be measured can thus be detected.

Optical Waveguide According to an Embodiment of the Present Disclosure

First Embodiment

An optical waveguide according to a first embodiment of the present disclosure is described with reference to FIGS. 1 through 12.

FIG. 1 illustrates the schematic configuration of an optical density measuring apparatus 14 according to the present embodiment and is also a conceptual drawing of the ATR method using the optical waveguide 15 according to the first embodiment. As illustrated in FIG. 1, the optical density measuring apparatus 14 is installed and used in an exterior space 16 containing a gas whose density or the like is to be detected. The optical density measuring apparatus 14 includes the optical waveguide 15 according to the present embodiment, the light source 17 capable of irradiating light (infrared radiation IR in the present embodiment) into the core layer 12 provided in the optical waveguide 15, and a light detector (an example of a detector) 18 capable of receiving the infrared radiation IR that has propagated through the core layer 12.

The optical waveguide 15 includes a substrate 19, the core layer 12 through which the infrared radiation IR (an example of light) can propagate, and a support 20 configured to connect at least a portion of the substrate 19 with at least a portion of the core layer 12 and support the core layer 12 with respect to the substrate 19. The core layer 12 and the substrate 19 are, for example, formed from silicon (Si), and the support 20 is, for example, formed from silicon dioxide ($SiO_2$). The substrate 19 and the support 20 are, for example, plate-shaped.

The core layer 12 includes the first diffraction grating unit (for example, a grating coupler) 11 formed at one end in the extending direction and the second diffraction grating unit (for example, a grating coupler) 13 formed at the other end. The core layer 12 includes the light propagation unit 10 between the first diffraction grating unit 11 and the second diffraction grating unit 13 located at the ends in the extending direction. The film thickness of the light propagation unit 10 in the optical waveguide 15 according to the present embodiment is uniform. The width of the light propagation unit 10 in the optical waveguide 15 according to the present embodiment is also uniform. The width direction is the direction perpendicular to the extending direction and the film thickness direction. The film thickness direction is the direction parallel to the stacking direction in which the substrate 19, support 20, and core layer 12 are stacked.

The first diffraction grating unit 11 is disposed in the emission direction of the light source 17. In the present embodiment, the optical waveguide 15 is arranged so that the stacking direction thereof is parallel to the vertical direction, and the principal surface of the substrate 19 is in a direction orthogonal to the vertically downward. The principal surface of the substrate 19 is a surface perpendicular to the thickness direction of the substrate 19 and refers, in the present embodiment, to the surface with the largest area among the six surfaces forming the substrate 19. In other words, the emission direction of the light source 17 is the vertically downward direction from the light source 17 when the optical waveguide 15 is installed in this manner. This diffraction grating unit is configured to couple the infrared radiation IR introduced from the light source 17 to the core layer 12. Accordingly, the light that propagates through the core layer 12 is inputted from the film thickness direction of the first diffraction grating unit 11. The second diffraction grating unit 13 is disposed in the direction facing the light detector 18. The direction facing the light detector 18 is the vertically downward direction from the light detector 18 when the optical waveguide 15 is installed in the above-described manner. This second diffraction grating unit extracts the infrared radiation IR propagating through the core layer 12 and emits the infrared radiation IR towards the light detector 18. Accordingly, the light that propagates through the core layer 12 is outputted in the film thickness direction of the second diffraction grating unit 13.

As illustrated in FIG. 1, the light propagation unit 10 is connected to the support 20 discontinuously in the extending direction and is structured to include a gap 21 without a predetermined layer, such as a cladding layer, present between the light propagation unit 10 and the substrate 19, except in the regions where the support 20 is provided.

In this way, the core layer 12 disposed at the light source 17 side (light introduction side) includes the first diffraction grating unit 11, and the core layer 12 disposed at the light detector 18 side (light emission side) includes the second diffraction grating unit 13. Between the center of the core layer 12 in the extending direction and the two ends is the light propagating unit 10 through which the infrared radiation IR introduced from the first diffraction grating unit 11 and emitted from the second diffraction grating unit 13 propagates. The evanescent wave EW extending from the core layer 12 is mainly absorbed by the substance to be measured present in the exterior space 16 at the light propagation unit 10.

The optical waveguide 15 in the first embodiment is now described in greater detail. As illustrated in FIG. 1, a sensor using the ATR method can improve the sensitivity of the sensor by expanding the region of interaction between the evanescent wave EW extending from the core layer 12 and the substance to be measured (i.e. by expanding the exposed portion of the core layer 12). Hence, to improve the sensor sensitivity, light from the light source 17 is preferably taken in as efficiently as possible at the first diffraction grating unit 11 (the light-emitting element and the optical waveguide 15 are preferably coupled highly efficiently), and after light is taken in, the light is preferably absorbed in the light propagation unit 10 of the core layer 12 by the substance to be measured located in the exterior space 16.

Figure 19A:
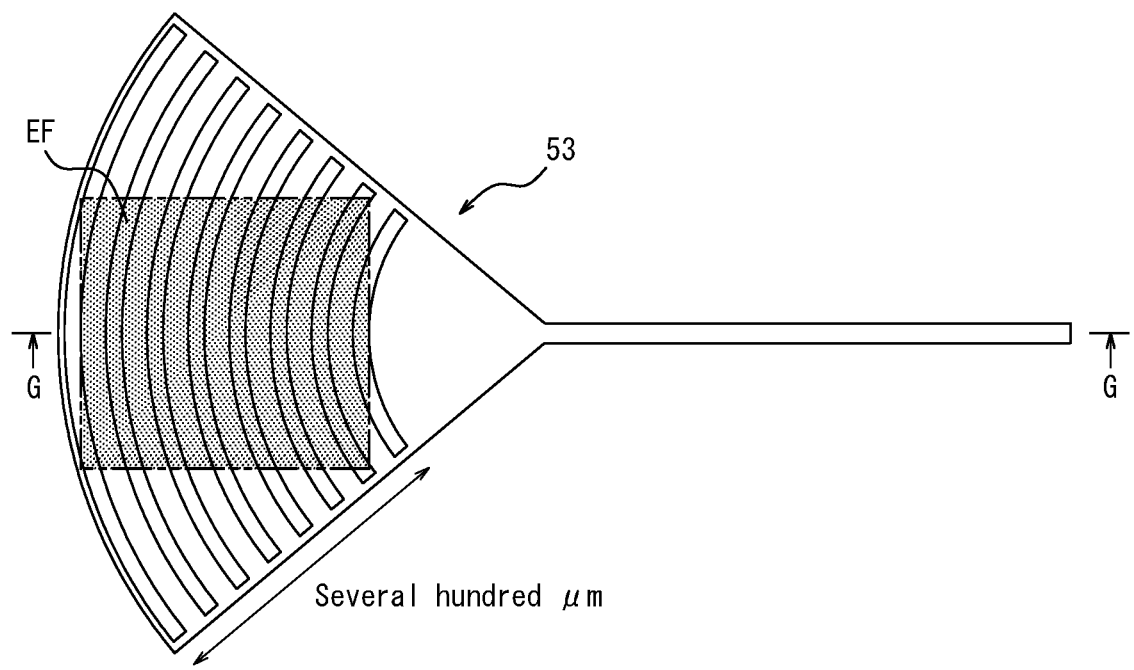
FIG. 19A is a plan view illustrating an example diffraction grating that is larger than the light-emitting surface of a light-emitting element.
Figure 19B:
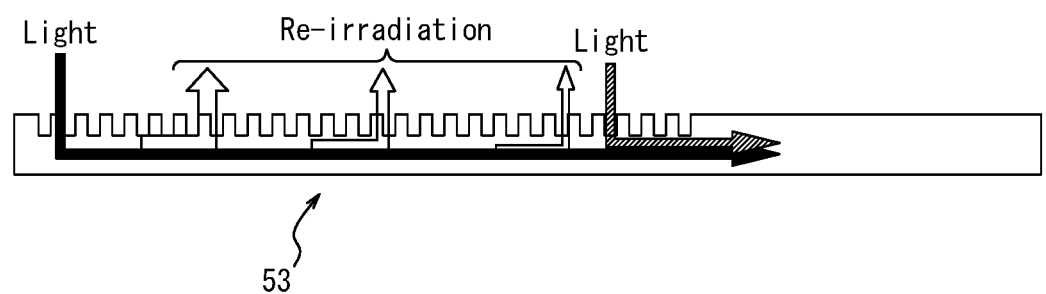
FIG. 19B is a view of a cross-section, taken along line G-G in FIG. 19A, in a state in which a portion of the light received by the diffraction grating is re-irradiated.

However, when one diffraction grating 53 larger than the light-emitting surface EF of the light-emitting element is formed, as illustrated in FIG. 19A, a portion of the light received at the distal portion of the diffraction grating 53, opposite the side connected to the light propagation unit, does not propagate to the connection side of the diffraction grating 53. Rather, this portion of the light is re-irradiated from inside the diffraction grating to the outside of the core layer at the middle section of the diffraction grating 53, as illustrated in FIG. 19B, making it difficult to take in light highly efficiently.

Figure 2:
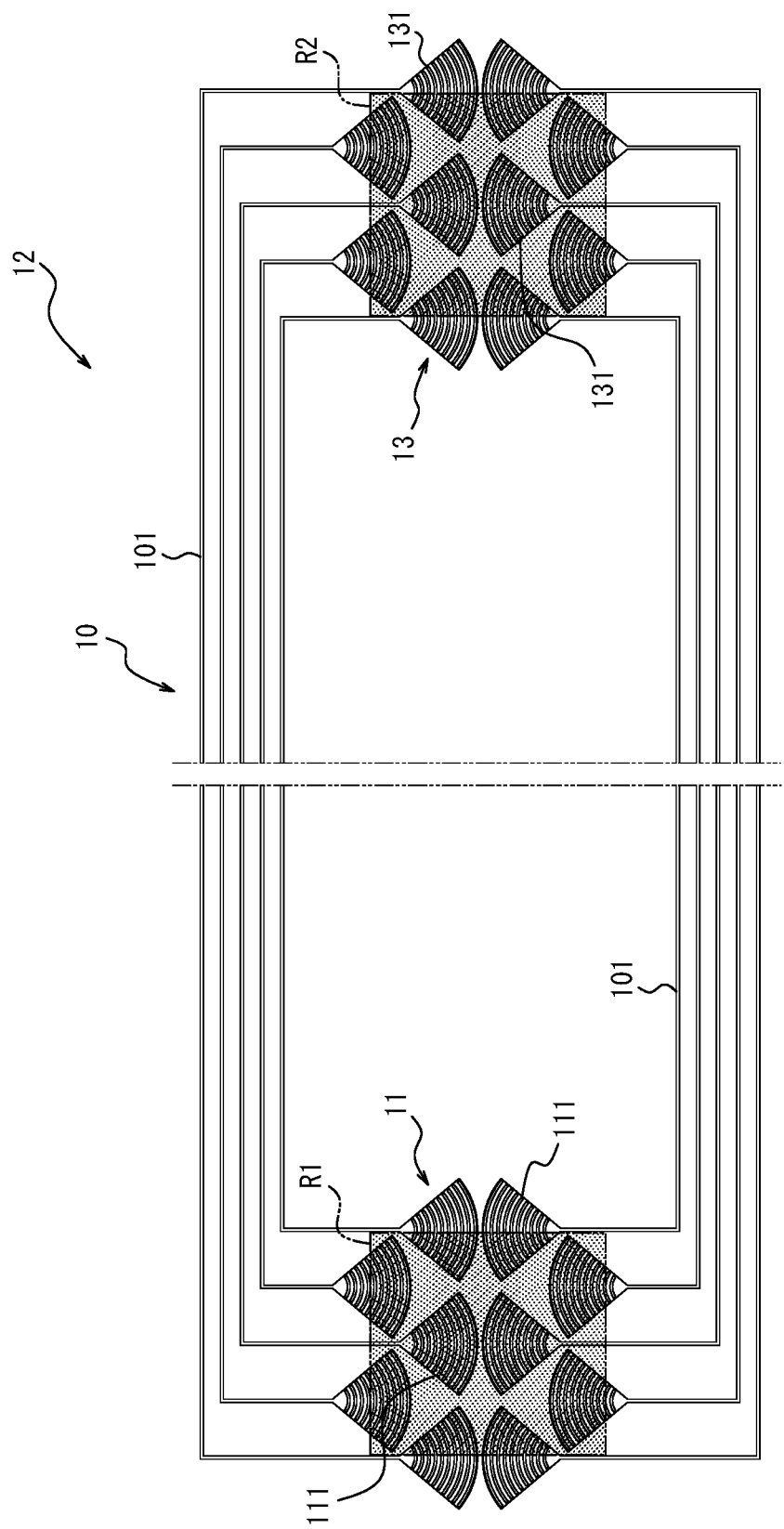
FIG. 2 is a plan view illustrating the optical waveguide in FIG. 1 from a light source side or a photodetector side.

To address this difficulty, the first diffraction grating unit 11 in the optical waveguide 15 of the first embodiment includes the plurality of first diffraction gratings 111, and at least two first diffraction gratings 111 among the plurality of first diffraction gratings 111 receive light emitted from the same light-emitting surface of the light source 17, as illustrated in FIG. 2. Specifically, the range R1 in FIG. 2 is a range, in plan view, yielded by projecting the range considered to be the same light-emitting surface within the light-emitting surface of the light source 17 onto the first diffraction grating unit 11 in a direction orthogonal to the light-emitting surface. At least two first diffraction gratings 111 are present within this range R1. As a result, the first diffraction gratings 111 can be formed with a relatively small size, the re-irradiation occurring in the diffraction grating 53 as illustrated in FIG. 19A can be suppressed, and the light-emitting element and the optical waveguide can be coupled highly efficiently.

All of the first diffraction gratings 111 of the first diffraction grating unit 11 are located within the range R1 in the example in FIG. 2, but a first diffraction grating 111 may be located outside of the range R1. Because light can be taken into the core layer 12 even by the first diffraction grating 111 located outside the range R1, since light spreads from the light-emitting surface of the light source 17.

In the optical waveguide 15 of the first embodiment, the light propagation unit 10 of the optical waveguide 15 has at least one linear propagation channel 101 that takes in the light received by one first diffraction grating 111, propagates the light, and guides the light to one second diffraction grating 131 (in the illustrated example, all of the propagation channels are linear propagation channels 101). This linear propagation channel 101 is linear overall and is shaped so that one second diffraction grating 131 corresponds to one first diffraction grating 111. In this way, the loss of light that would occur upon combining and splitting in the branched propagation channel 102 formed in the second embodiment, described below, can be prevented, and light can be used more efficiently.

In the example in FIG. 2, the shape of both the first diffraction grating 111 and the second diffraction grating 131 is a fan centered on the apex 111*t* of the first diffraction grating 111 and the second diffraction grating 131 (FIG. 3A), but the diffraction grating may have any shape in plan view in the present embodiment.

While not limited, the shape may have a portion that widens from the connection side towards the distal side, with the apex 111*t* of the connection side of the first diffraction grating 111 and the second diffraction grating 131 to the light propagation unit 10 as the tip, for example. That is, apart from the fans centered on the apex 111*t* (FIGS. 3A, 3B), the shape may be a triangle, such as an isosceles triangle (FIG. 3C), with the apex 111*t* as the tip, or a shape with a first portion having the apex 111*t* as the tip and widening from the connection side towards the distal side and a second portion with an arbitrary shape, such as a rectangle, continuous with this first portion (FIG. 3D). The shape of the diffraction grating preferably has line symmetry relative to a virtual line from the connection side towards the distal side and preferably has a shape that does not decrease in width from the apex 111*t* towards the intake unit or the extraction unit.

Figure 3A:
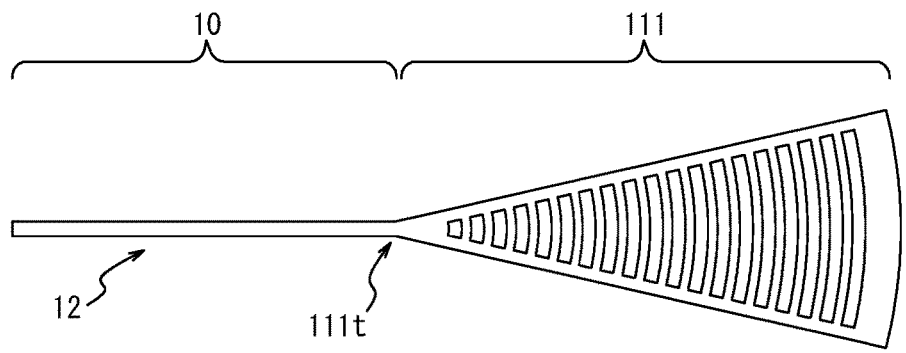
FIGS. 3A to 3D are plan views illustrating example shapes near the diffraction gratings of the optical waveguide in FIG. 1.
Figure 3B:
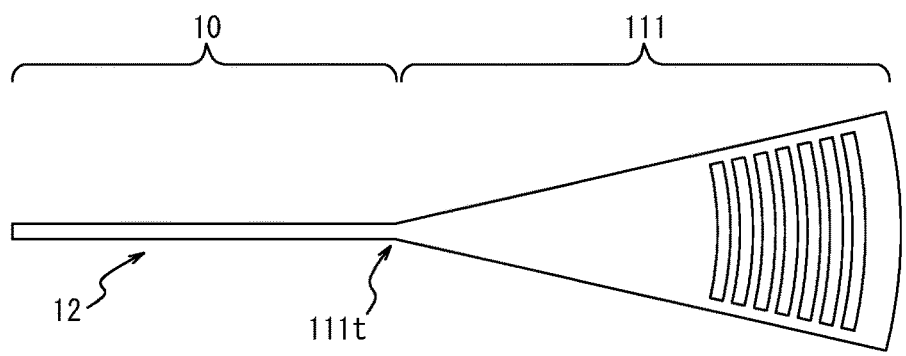
Figure 3C:
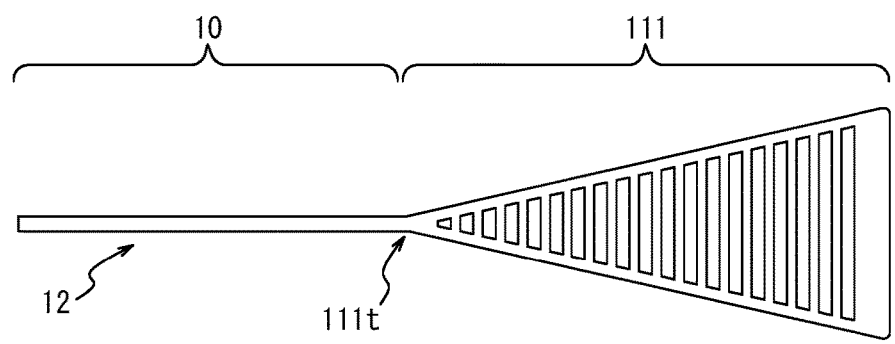
Figure 3D:
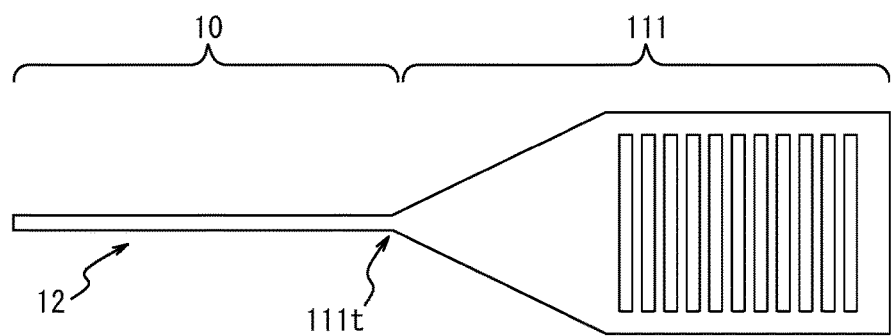

The first diffraction grating 111 may have a portion in which no unevenness is formed in the portion adjacent to the light intake unit on the side connected to the light propagation unit 10, as illustrated in FIGS. 3B and 3D, for example. In other words, the light intake unit need not be formed up to the area near the apex 111*t* of the diffraction grating as in FIGS. 3A and 3C.

In the first embodiment, at least one first diffraction grating 111 (all in the illustrated example) among the plurality of first diffraction gratings 111 has a maximum diffraction grating length GLM of 20λ or less. The light-emitting element and the optical waveguide 15 can thereby be coupled more efficiently. Here, λ is the average wavelength of the light in a vacuum. Assuming that the gas to be measured is $CO_2$, for example, λ is approximately 4.3 μm.

In the illustrated example, all of the first diffraction gratings 111 of which the maximum diffraction grating length GLM is 20λ or less are located within the range R1, but it is preferable that at least one be located within the range R1. A first diffraction grating 111 of which the maximum diffraction grating length GLM is 20λ or less may be located outside of the range R1.

Figure 4A:
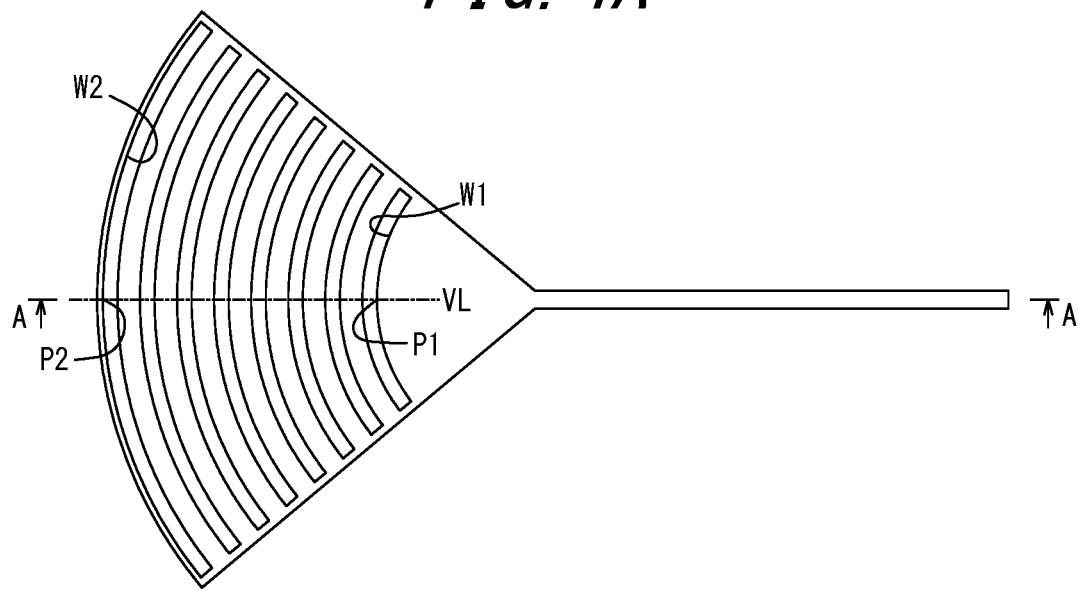
FIG. 4A is a plan view.
Figure 4B:
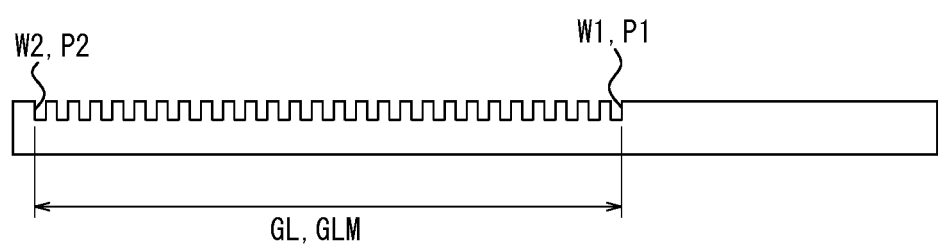
FIG. 4B is a cross-sectional view, taken along line A-A, of the shape near the diffraction grating in FIG. 4A, to illustrate a method of measuring diffraction grating length near the diffraction grating of the optical waveguide in FIG. 1.

The diffraction grating length GL of the first diffraction grating 111 is measured starting at a specific point (such as starting point P1) in the extending direction of the wall W1, among the walls dividing the recessed portions or protruding portions of the intake unit of the above-described first diffraction grating 111, that is positioned closest to the connection side, as illustrated in FIGS. 4A, 4B. The diffraction grating length GL indicates the length from the starting point P1 towards the distal side, along a virtual line VL extending in a direction orthogonal to the extending direction of the wall from the specific point P1, to the wall W2 positioned closest to the distal side along the virtual line VL (the wall, among the walls dividing the recessed portions or protruding portions of the intake unit, that is positioned closest to the distal side). The diffraction grating length GL is thus the length from the starting point P1 on the wall W1 to an ending point P2, on the wall W2, positioned along the virtual line VL. The diffraction grating length GL of the first diffraction grating 111 can change depending on the shape of the intake unit of the first diffraction grating 111. That is, the length from the aforementioned staring point can change depending on the shape of the intake unit. The maximum diffraction grating length GLM of the first diffraction grating 111 indicates the longest length among the aforementioned diffraction grating lengths GL.

The number of first diffraction gratings 111 is ten in the example in FIG. 2, but any number may be provided. In the present embodiment, four or more first diffraction gratings 111 in the first diffraction grating unit 11 preferably have a maximum diffraction grating length GLM of 80 μm or less.

In the present embodiment, at least two first diffraction gratings 111 among the plurality of first diffraction gratings 111 in the first diffraction grating unit 11 are connected to the light propagation unit 10 in opposite directions in plan view of the optical waveguide 15.

Specifically, in the example in FIG. 2, one first diffraction grating 111 at a position on the axis (the widthwise center line of the first diffraction grating 111, also referred to below as the diffraction grating axis) of another first diffraction grating 111 is arranged in the opposite direction from the another first diffraction grating 111. In other words, the connection direction from one first diffraction grating 111 to the light propagation unit 10 (propagation channel) is opposite from the connection direction from another first diffraction grating 111, and both connection directions lead outward from the center of the range R1 to connect to the light propagation unit 10. Other first diffraction gratings 111 are also similarly arranged in the example in FIG. 2 so that the first diffraction grating unit 11 overall has line symmetry (and point symmetry).

At least two first diffraction gratings 111 among the plurality of first diffraction gratings 111 in the present embodiment are preferably located in a 5×5 mm$^2$ range, more preferably a 1×1 mm$^2$ range, and even more preferably a 500×500 μm$^2$ range. This enables the light-emitting element and the optical waveguide 15 to be coupled highly efficiently.

In the present embodiment, the ratio of the area of first diffraction gratings 111 is preferably 30% or more in a 5×5 mm$^2$ range. The ratio of the area of first diffraction gratings 111 is more preferably 30% or more in a 1×1 mm$^2$ range. The ratio of the area of first diffraction gratings 111 is even more preferably 30% or more in a 500×500 μm$^2$ range. This enables the light-emitting element and the optical waveguide 15 to be coupled highly efficiently.

In the present embodiment, the second diffraction grating unit 13 may have any structure. Specifically, the structure of the second diffraction grating unit 13 in the illustrated example is the same as the structure of the first diffraction grating unit 11 but may instead be different. A range R2 in FIG. 2 is a range, in plan view of the substrate 19 of the optical waveguide 15 (when looking towards the substrate 19), yielded by projecting the range of the detector onto the second diffraction grating unit 13 in a direction orthogonal to the detection surface of the detector. The size and arrangement of the diffraction gratings in the second diffraction grating unit 13 may, however, be changed in any way depending on the detector, for example.

Next, a method of manufacturing the optical waveguide 15 according to the first embodiment is described with reference to FIGS. 5 through 12.

In FIGS. 5 through 12, one diffraction grating in the first diffraction grating unit 11 is simplified and illustrated schematically to facilitate the explanation of the method of manufacturing the optical waveguide 15.

Figure 5:
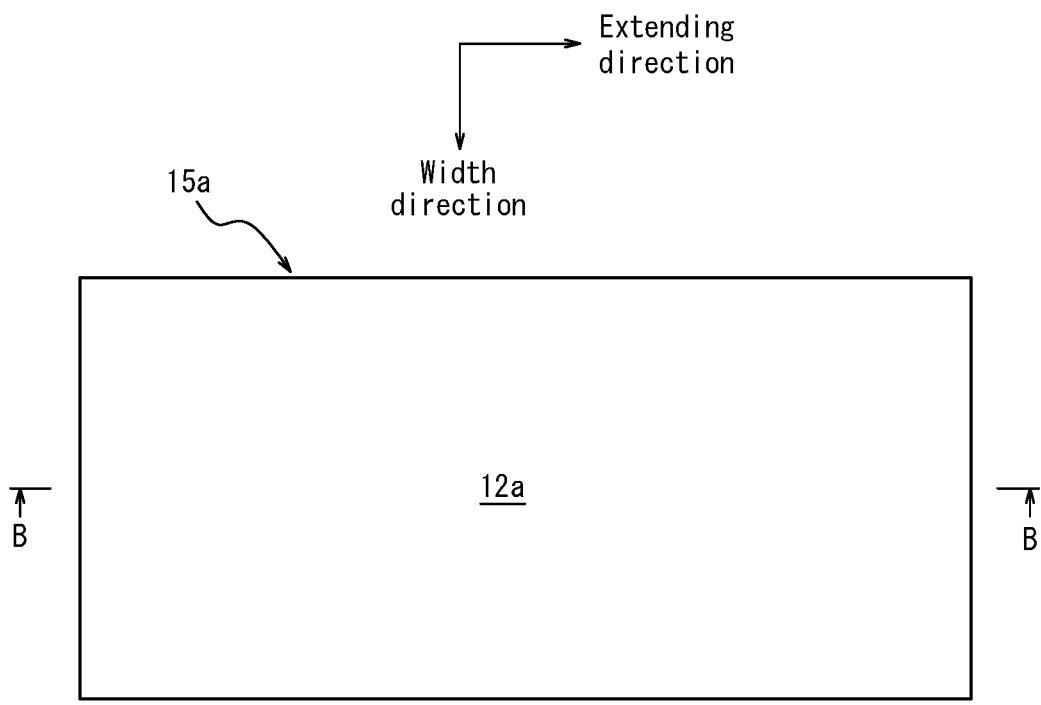
FIG. 5 is a plan view of a portion of an SOI substrate to illustrate a method of manufacturing an optical waveguide used in an optical density measuring apparatus according to the first embodiment of the present disclosure.
Figure 6:
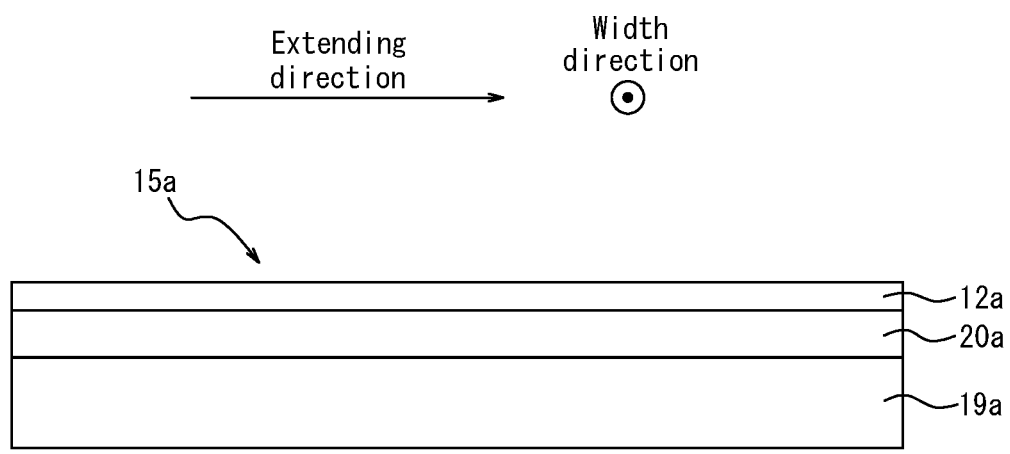
FIG. 6 is a cross-sectional view illustrating a cross-section of the SOI substrate in FIG. 5 taken along the B-B line.
Figure 7:
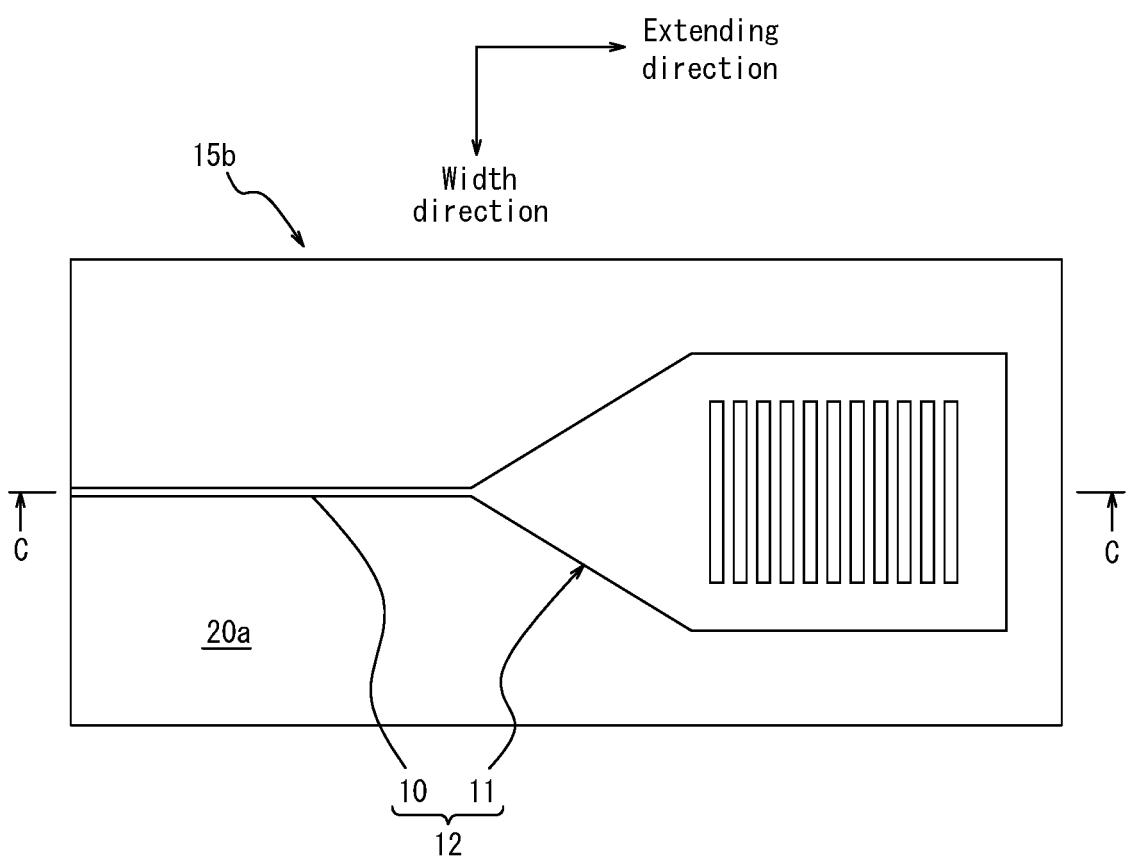
FIG. 7 is a plan view partially illustrating an optical waveguide main portion to illustrate a method of manufacturing the optical waveguide used in the optical density measuring apparatus according to the first embodiment of the present disclosure.
Figure 8:
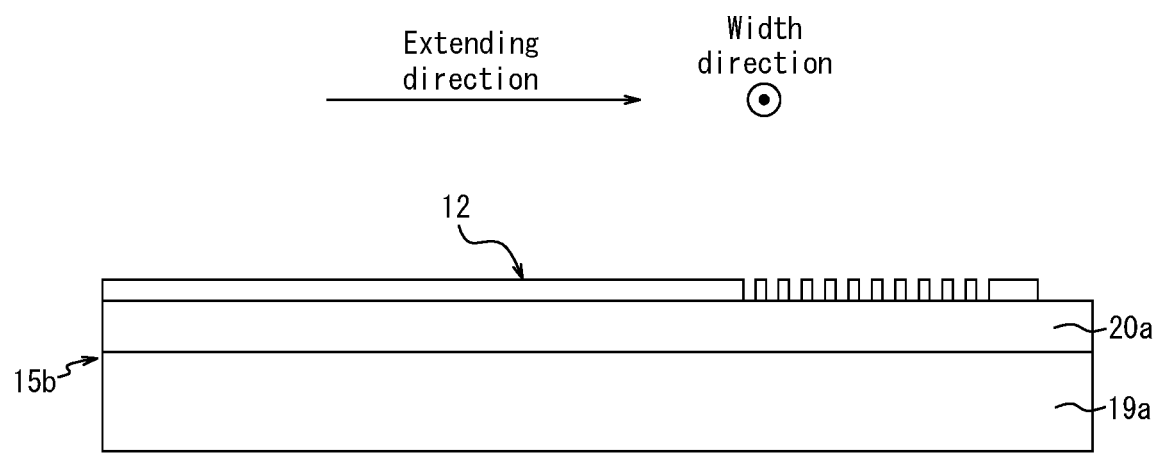
FIG. 8 is a cross-sectional view illustrating a cross-section of the diffraction grating and a portion of the light propagation unit in the optical waveguide in FIG. 7, taken along the C-C line.
Figure 9:
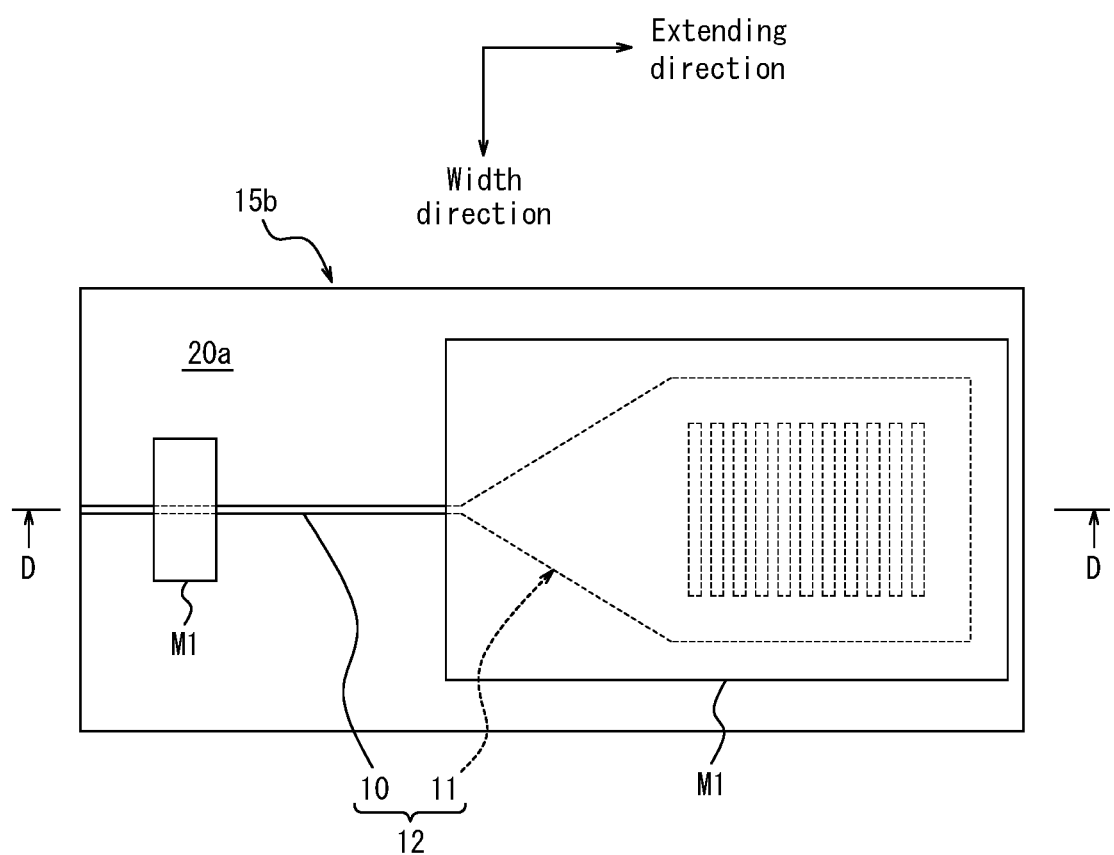
FIG. 9 is a plan view partially illustrating an optical waveguide main portion covered by a mask layer to illustrate a method of manufacturing the optical waveguide used in the optical density measuring apparatus according to the first embodiment of the present disclosure.
Figure 10:
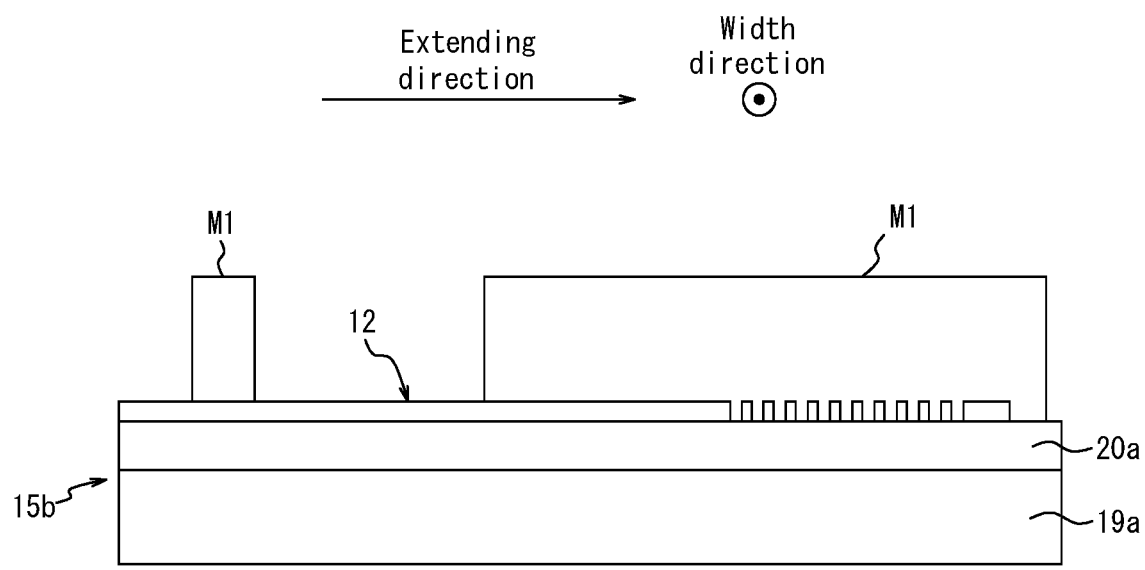
FIG. 10 is a cross-sectional view illustrating a cross-section of the diffraction grating and a portion of the light propagation unit in the optical waveguide in FIG. 9, taken along the D-D line.
Figure 11:
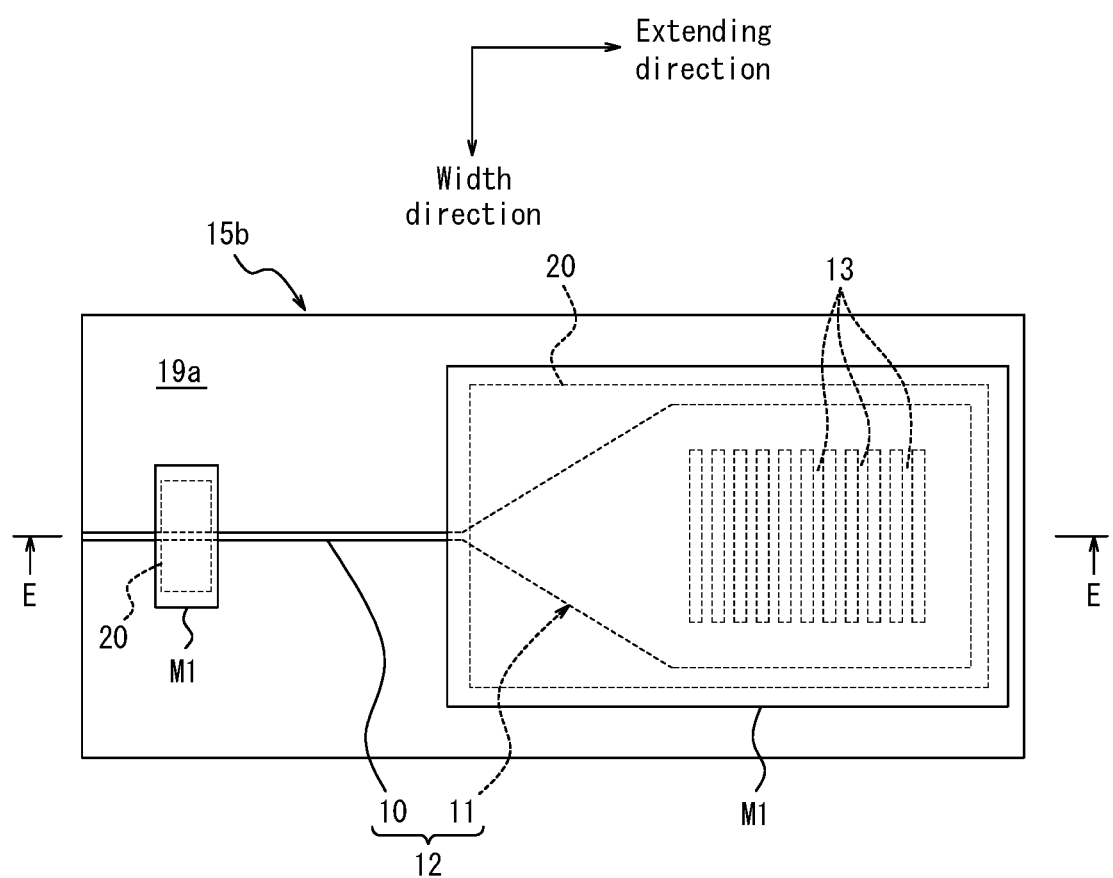
FIG. 11 is a plan view partially illustrating an optical waveguide main portion with a portion of a BOX layer removed to illustrate a method of manufacturing the optical waveguide used in the optical density measuring apparatus according to the first embodiment of the present disclosure.
Figure 12:
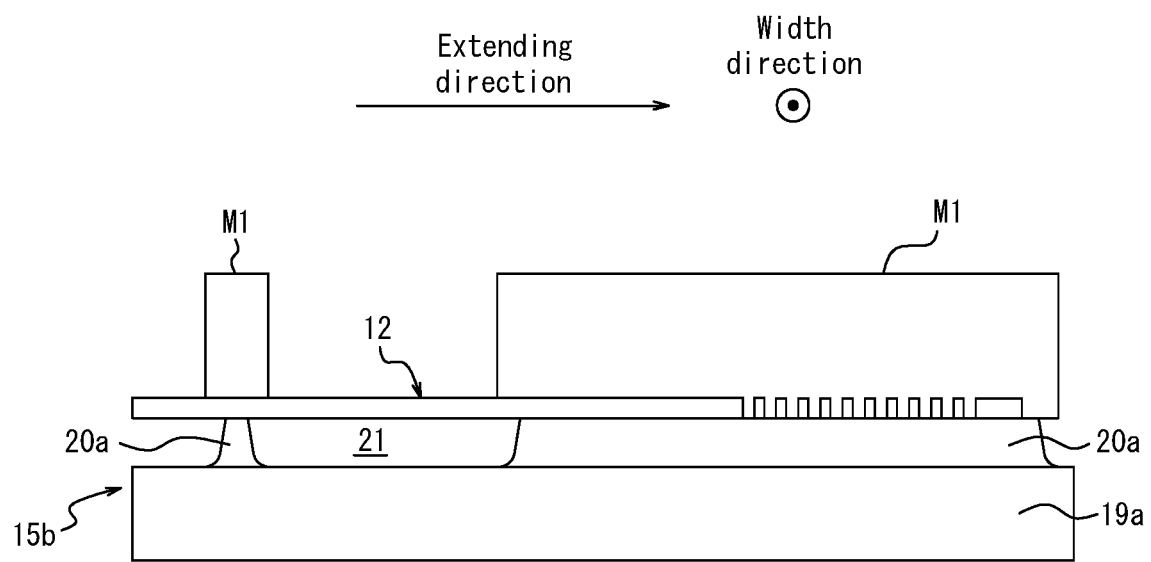
FIG. 12 is a cross-sectional view illustrating a cross-section of the diffraction grating and a portion of the light propagation unit in the optical waveguide in FIG. 11, taken along the E-E line.

FIG. 5 is a manufacturing process plan view of the optical waveguide 15. FIG. 6 is a manufacturing process cross-sectional view of the optical waveguide 15 taken along the B-B line in FIG. 5. FIG. 7 is a manufacturing process plan view of the optical waveguide 15. FIG. 8 is a manufacturing process cross-sectional view of the optical waveguide 15 taken along the C-C line in FIG. 7. FIG. 9 is a manufacturing process plan view of the optical waveguide 15. FIG. 10 is a manufacturing process cross-sectional view of the optical waveguide 15 taken along the D-D line in FIG. 9. FIG. 11 is a manufacturing process plan view of the optical waveguide 15, and FIG. 12 is a manufacturing process cross-sectional view of the optical waveguide 15 taken along the E-E line in FIG. 11.

First, as illustrated in FIGS. 5 and 6, an SiO$_2$ film is formed on either or both of a support substrate 19a, which is formed from silicon and ultimately becomes the substrate 19, and an active substrate 12a, which is formed from silicon and from which the core layer 12 is formed. The support substrate 19a and the active substrate 12a are then stuck together, with the SiO$_2$ film therebetween, and bonded by thermal process. The active substrate 12a is then ground, polished, or the like to a predetermined thickness to adjust the film thickness of the active substrate 12a. Consequently, an SOI substrate 15a is formed to have a "silicon-insulating layer-silicon" structure that includes the support substrate 19a, a BOX layer 20a formed on the support substrate 19a, and the active substrate 12a formed on the BOX layer 20a.

Next, lithography and etching are used on the SOI substrate 15a to etch the active substrate 12a and form the core layer 12, which is made up of the light propagation unit 10 and the diffraction grating units 11, 13. Consequently, as illustrated in FIGS. 7 and 8, an optical waveguide main portion 15b is formed to include the plate-shaped support substrate 19a, the plate-shaped BOX layer 20a formed on the support substrate 19a, and the core layer 12 formed as a rectangular prism on a portion of the BOX layer 20a.

In the present embodiment, the support 20 that is discontinuous in the extending direction is connected to the light propagation unit 10. When the support 20 is formed discontinuously in this way, the following steps can be performed in addition to the aforementioned steps.

Specifically, as illustrated in FIGS. 9 and 10, a mask layer M1 covering a portion of the core layer 12 and the BOX layer 20a is formed. The mask layer M1 is arranged to cover the regions where the BOX layer 20a is to remain as the support 20. For example, in the first embodiment, the mask layer M1 is arranged to cover a rectangle region that is centered on the position where the support 20 is to be formed in the extending direction of the light propagation unit 10, is wider than the width of the light propagation unit 10 in the width direction, and is longer than the design length of the support 20. In the first embodiment, the mask layer M1 is also arranged to cover a rectangular region that is larger than the entire diffraction grating units 11, 13, for example. The mask layer M1 may be a photoresist or a hard mask such as a silicon nitride film.

Next, a portion of the BOX layer 20a of the optical waveguide main portion 15b is removed by wet etching or the like, with the mask layer M1 as a mask. Etching that has an isotropic component is performed to remove the BOX layer 20a below the optical propagation unit 10, which is the narrow portion of the core layer 12. The BOX layer 20a under the mask layer M1 remains as the support 20. This can achieve a structure such that the gap 21 is present between a portion of the light propagation unit 10 in the extending direction thereof and the support substrate 19a, and the entire diffraction grating units 11, 13 are supported to be fixed by the support 20, as illustrated in FIGS. 11 and 12.

The mask layer M1 is subsequently etched, yielding the optical waveguide main portion 15b with a structure corresponding to that of the optical waveguide 15 of the first embodiment, as illustrated in FIGS. 2 and 3.

Next, the support substrate 19a is cut in a predetermined region to separate the optical waveguide main portion 15b. This completes the optical waveguide 15 (see FIG. 2) that includes the gap 21, between a portion of the light propagation unit 10 in the extending direction thereof and the substrate 19, and in which the entire diffraction grating units 11, 13 are fixed.

Second Embodiment

Figure 13:
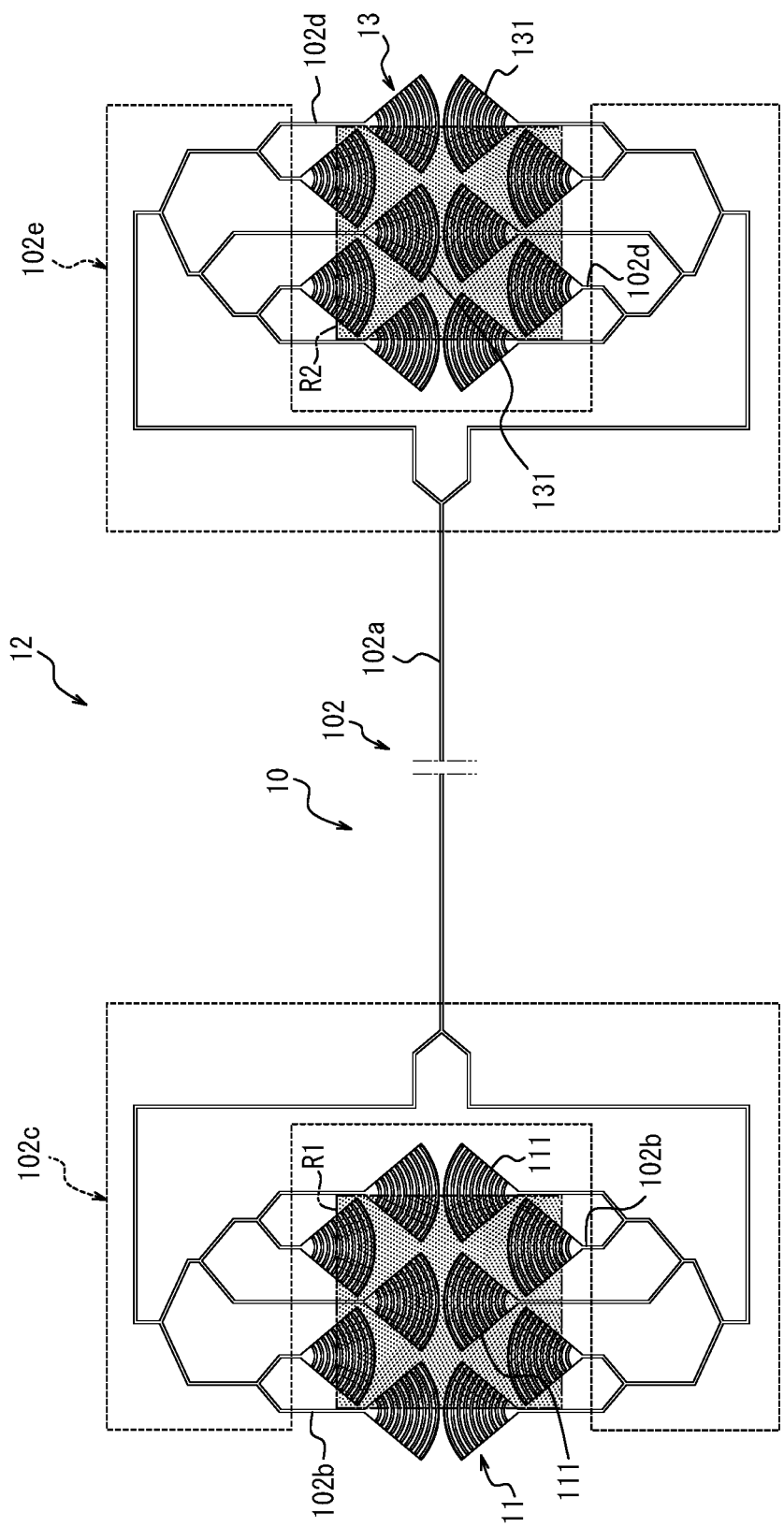
FIG. 13 is a plan view illustrating an optical waveguide used in an optical density measuring apparatus according to a second embodiment of the present disclosure from a light source side or a photodetector side.

An optical waveguide according to a second embodiment of the present disclosure is described next with reference to FIG. 13. Constituent elements that are the same as in the first embodiment are labeled with the same reference signs, and a description thereof is omitted.

In the second embodiment, a light propagation unit 10 includes at least one branched propagation channel 102 that includes a linear portion 102a positioned in the central region, a plurality of first diffraction grating side portions 102b into which the light received by a plurality of first diffraction gratings 111 is introduced, a converging portion 102c where propagation channels from the plurality of first diffraction grating side portions 102b to the linear portion 102a converge, and a plurality of second diffraction grating side portions 102d that guide the light propagated through the linear portion 102a towards a second diffraction grating unit 13. Specifically, the light propagation unit 10 has only one branched propagation channel 102, which includes the one linear portion 102a, the same number of first diffraction grating side portions 102b as the number of first diffraction gratings 111 in the first diffraction grating unit 11 (10 in the illustrated example), and the converging portion 102c to converge from the plurality of first diffraction grating side portions 102b towards the linear portion 102a. The propagation channels of the plurality of first diffraction grating side portions 102b may converge in stages in the converging portion 102c, as illustrated. While omitted from the drawings, all of the first diffraction grating side portions 102b may instead converge at once. Specifically, in the illustrated example, two propagation channels at a time converge from the first diffraction grating side portions 102b towards the linear portion 102a, and 9 convergence points are located in the converging portion 102c.

In the second embodiment, a plurality of second diffraction grating side portions 102d is included. Furthermore, a branching portion 102e in which the propagation channel branches from the linear portion 102a to the plurality of second diffraction grating side portions 102d is provided between the linear portion 102a and the second diffraction grating side portions 102d. Like the converging portion 102c, the branching portion 102e may branch the propagation channel to the plurality of second diffraction grating side portions 102d in stages, as illustrated. While omitted from the drawings, the propagation channel may be branched to all of the second diffraction grating side portions 102d at once. Specifically, the propagation channel is branched into two channels at a time from the linear portion 102a towards the second diffraction grating side portions 102d, and 9 branch points are located in the branching portion 102e in the illustrated example.

As a result of the light propagation unit 10 including the branched propagation channel 102 in the second embodiment, the propagation channels of the light propagation unit 10 do not become complex even if a plurality of first diffraction gratings 111 are provided, and the light propagation unit 10 can be made more compact.

The branched propagation channel 102 of the light propagation unit 10 of the second embodiment may be formed in the optical waveguide 15 in the first embodiment instead of or in addition to the light propagation unit 10 of the optical waveguide 15 in the first embodiment.

The optical waveguide 15 according to the second embodiment can be manufactured with a similar method to the aforementioned method of manufacturing the optical waveguide 15 according the first embodiment.

Third Embodiment

An optical waveguide according to a third embodiment of the present disclosure is described next with reference to FIG. 14. Constituent elements that are the same as in the above embodiments are labeled with the same reference signs, and a description thereof is omitted.

In the first and second embodiments, the first diffraction gratings 111 in the first diffraction grating unit 11 are all the same size and shape. In the third embodiment, however, the first diffraction gratings 111 have different sizes and shapes. The provision of diffraction gratings with different sizes and shapes in the third embodiment can increase the density of the diffraction gratings.

Specifically, three types of fan-shaped first diffraction gratings 111 (first-a diffraction gratings 111a, first-b diffraction gratings 111b, and first-c diffraction gratings 111c) are provided in the illustrated example. The central angle of the apex 111t decreases in order of the first-a diffraction gratings 111a, first-b diffraction gratings 111b, and first-c diffraction gratings 111c, and the diffraction grating itself grows smaller in this order. The maximum diffraction grating length GLM is the same in the illustrated example but may instead be changed for each diffraction grating 111.

Figure 14:
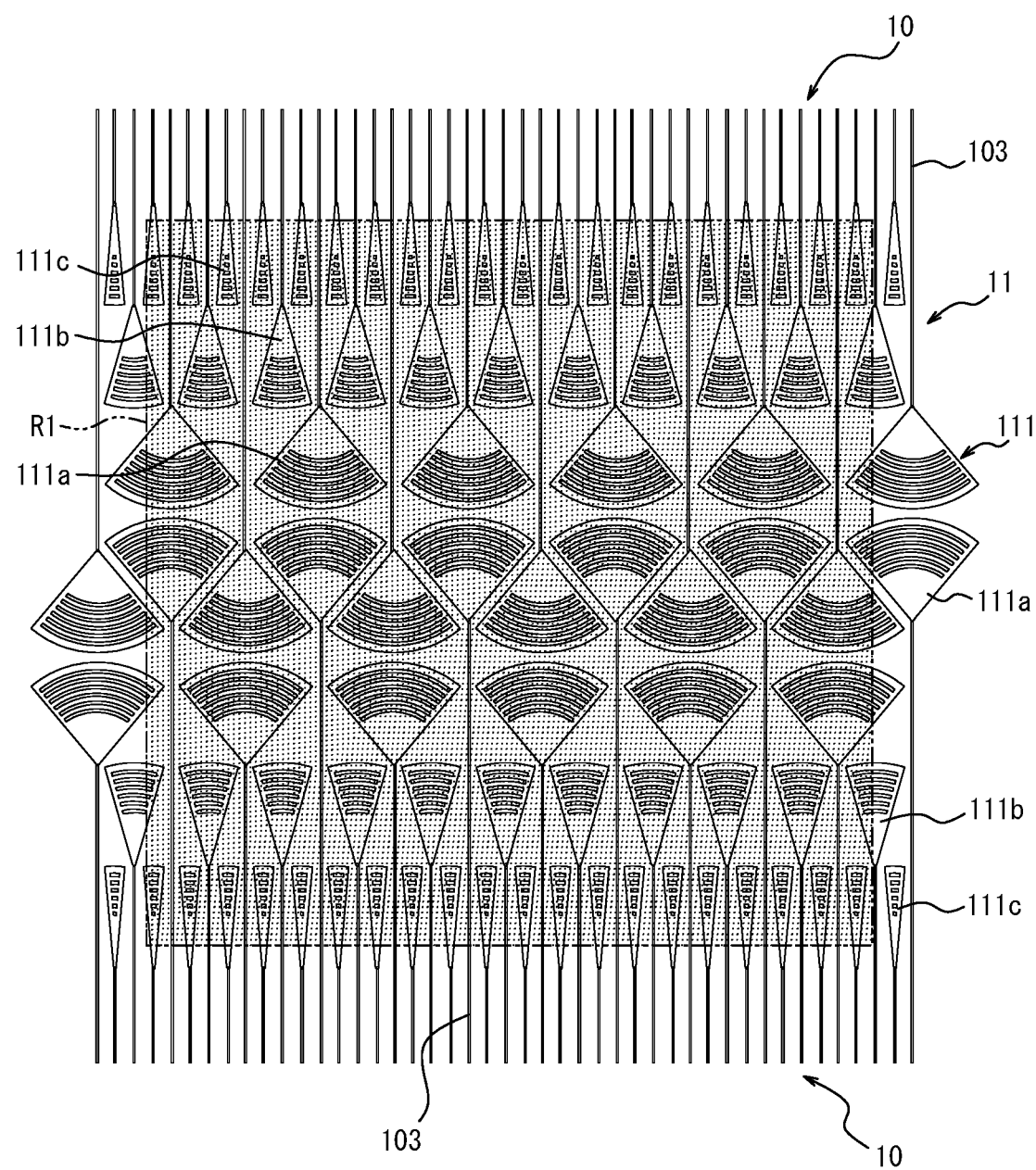
FIG. 14 is a plan view illustrating an optical waveguide used in an optical density measuring apparatus according to a third embodiment of the present disclosure from a light source side or a photodetector side.

In the range R1 of the first diffraction grating unit 11 on which the light-emitting surface is projected in the illustrated example, pairs of first-a diffraction gratings 111a whose distal sides abut against each other in the vertical direction at the vertically central region of the figure are staggered in the horizontal direction of FIG. 14. In other words, the orientation (arrangement direction) of the first-a diffraction gratings 111a alternates in the vertically central region of FIG. 14. The first-b diffraction gratings 111b are arranged in the vertically intermediate portions of the range R1 (between the above-described vertically central region and the below-described vertical ends), between propagation channels 103 that connect to the first-a diffraction gratings 111a, so that the connection side of the diffraction gratings faces a vertical end of the range R1. Furthermore, the first-c diffraction gratings 111c are arranged at the vertical ends of the range R1, between propagation channels 103 that connect to the first-a diffraction gratings 111a and propagation channels 103 that connect to the first-b diffraction gratings 111b, so that the connection side of the diffraction gratings faces a vertical end of the range R1.

Accordingly, in the third embodiment, the first diffraction gratings 111 are arranged in the range R1 of the first diffraction grating unit 11 on which the light-emitting surface is projected so that relatively large first diffraction gratings 111 are arranged in the vertically central region of the range R1, and progressively smaller first diffraction gratings 111 are arranged closer towards the ends of the range R1. This makes it easier for the ratio of the area of first diffraction gratings 111 in a 5×5 mm$^2$ range, a 1×1 mm$^2$ range, or a 500×500 μm$^2$ range to become 30% or more. Consequently, the light-emitting element and the optical waveguide 15 can be coupled more efficiently.

The first diffraction grating unit 11 of the third embodiment may be formed in the optical waveguide 15 instead of the first diffraction grating unit 11 of the optical waveguide 15 in the first and second embodiments.

The optical waveguide 15 according to the third embodiment can be manufactured with a similar method to the aforementioned method of manufacturing the optical waveguide 15 according the first embodiment.

Fourth Embodiment

Figure 15:
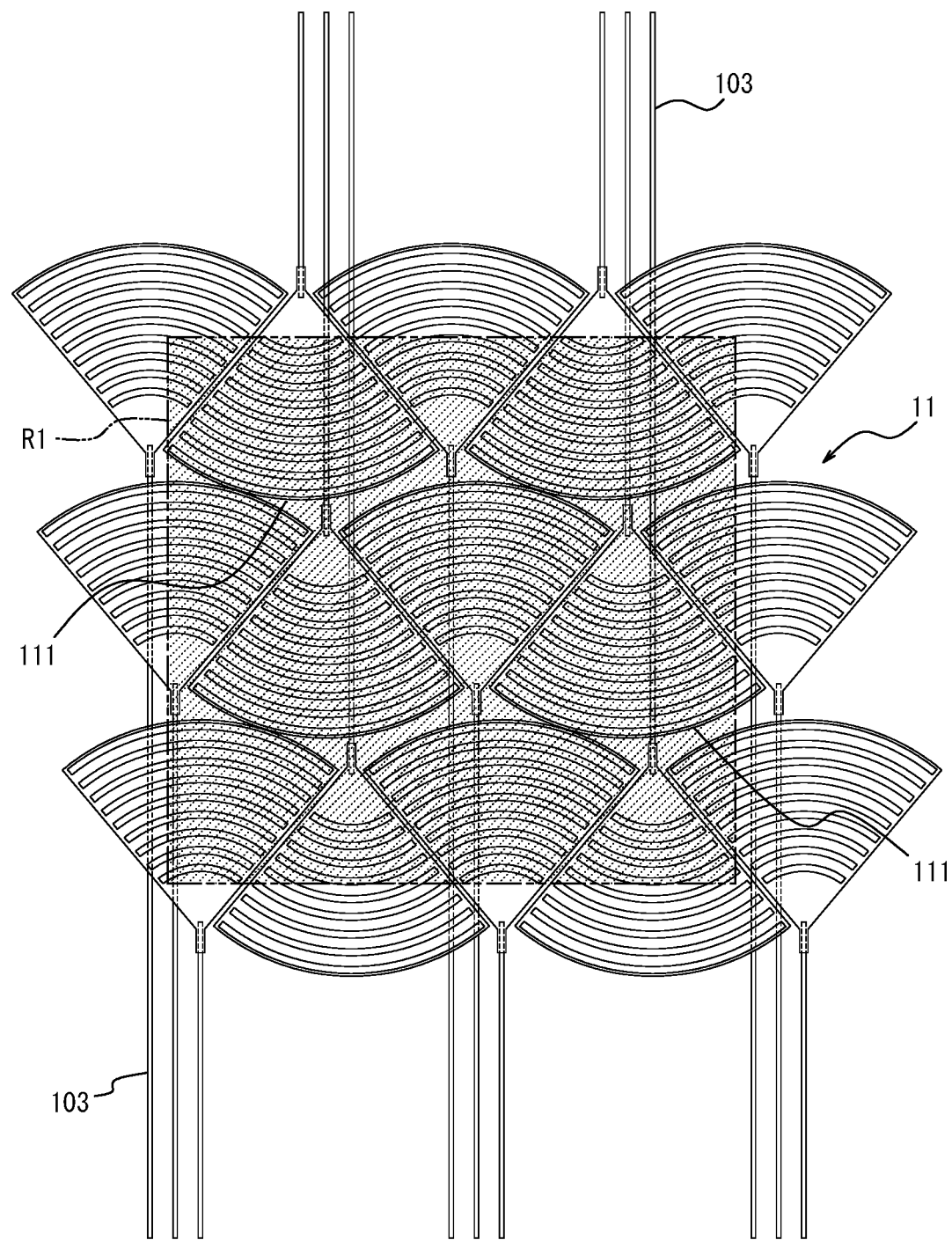
FIG. 15 is a plan view illustrating an optical waveguide used in an optical density measuring apparatus according to a fourth embodiment of the present disclosure from a light source side or a photodetector side.
Figure 18:
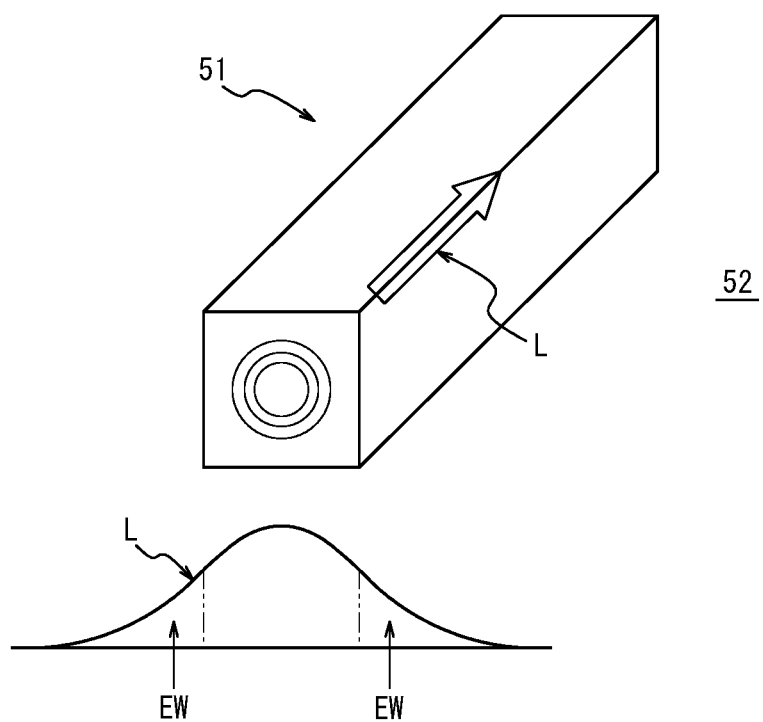
FIG. 18 illustrates an evanescent wave of light propagating through the optical waveguide.

An optical waveguide according to a fourth embodiment of the present disclosure is now described with reference to FIGS. 15 and 16. Constituent elements that are the same as in the above embodiments are labeled with the same reference signs, and a description thereof is omitted.

In the first to third embodiments, the first diffraction gratings 111 of the first diffraction grating unit 11 and the propagation channels of the light propagation unit 10 are formed in the same stacked layer of the optical waveguide 15. In the fourth embodiment, however, the first diffraction gratings 111 are formed on the surface layer side of the optical waveguide 15. And the propagation channels 103 are formed in a different layer than the first diffraction gratings 111, positioned at a closer side to the substrate 19 than the first diffraction gratings 111. This allows the first diffraction gratings 111 to be arranged more densely. In other words, the layer forming the first diffraction gratings 111 and the layer forming the propagation channels 103 are grade-separated.

Specifically, one first diffraction grating 111 is formed on the surface layer side of the optical waveguide 15, and the subsequent propagation channel 103 is formed in a layer positioned at a closer side to the substrate 19 than the first diffraction grating 111 in the fourth embodiment, as illustrated in FIG. 16A, which is an enlargement of a portion of the first diffraction grating unit 11 and the propagation channel 103, and FIG. 16B, which is a cross-sectional view taken along line F-F in FIG. 16A. This propagation channel 103 is formed in a layer positioned at a closer side to the substrate 19 than one first diffraction grating 111. Therefore, another first diffraction grating 111 adjacent on the connection side to the one first diffraction grating 111 is formed on the surface layer side relative to the propagation channel 103 connected to the one first diffraction grating 111. Furthermore, when a plurality of first diffraction gratings 111 are formed in this way in the fourth embodiment, then first diffraction gratings 111 that are adjacent in the axial direction form one row while their axes are shifted from one another, as illustrated in FIG. 15. With respect to this one row of first diffraction gratings 111, another row of first diffraction gratings 111 adjacent in the horizontal direction of FIG. 15 is formed to face the opposite direction so that the first diffraction gratings 111 overall are arranged in alternate directions.

Accordingly, formation of the first diffraction gratings 111 on the surface layer side of the optical waveguide 15 and formation of the propagation channels 103 on the substrate 19 side of the optical waveguide 15 in a separate layer from the first diffraction gratings 111 enables the first diffraction gratings 111 to be arranged more densely in the range R1 of the first diffraction grating unit 11 on which the light-emitting surface is projected in the fourth embodiment. For example, this makes it easier for the ratio of the area of first diffraction gratings 111 in a 5×5 mm$^2$ range, a 1×1 mm$^2$ range, or a 500×500 μm$^2$ range to become 60% or more. Consequently, the light-emitting element and the optical waveguide 15 can be coupled more efficiently.

In the fourth embodiment, the first diffraction grating 111 and the propagation channel 103 are optically coupled, for example by an evanescent wave, so that the first diffraction grating 111 can guide light to the propagation channel 103.

The first diffraction grating unit 11 of the fourth embodiment may be formed in the optical waveguide 15 instead of the first diffraction grating unit 11 of the optical waveguide 15 in the first to third embodiments.

INDUSTRIAL APPLICABILITY

The present disclosure can provide an optical density measuring apparatus and optical waveguide capable of coupling a light-emitting element and an optical waveguide highly efficiently.

The invention claimed is:

1. An optical density measuring apparatus for measuring density of a gas or a liquid to be measured, the optical density measuring apparatus comprising:
   an optical waveguide comprising a substrate, a core layer, and a support configured to connect at least a portion of the substrate with at least a portion of the core layer and support the core layer with respect to the substrate;
   a light source capable of irradiating light into the core layer; and
   a detector capable of receiving light propagated through the core layer,
   wherein the core layer comprises a propagation channel capable of propagating light in an extending direction thereof, and a plurality of first diffraction gratings configured to receive the light from the light source and guide the light to the propagation channel,
   wherein the plurality of the first diffraction gratings are disposed near to and facing a light-emitting surface of the light source,
   wherein a length between the light-emitting surface of the light source and the plurality of the first diffraction gratings is 1 mm or less, or $\sqrt{Ss}$ or less where Ss is an area of a same light-emitting surface of the light source,
   wherein at least two of the first diffraction gratings are configured to receive light emitted from the same light-emitting surface of the light source, and
   wherein the area of the same light-emitting surface of the light source is greater than an area of one of the at least two of the first diffraction gratings.

2. The optical density measuring apparatus of claim 1, wherein a spectrum yielded by combining a selected wavelength spectrum of each of the first diffraction gratings is unimodal.

3. The optical density measuring apparatus of claim 1, wherein the core layer further comprises a second diffraction grating configured to take in light from the propagation channel and output the light to the detector, and
   wherein the propagation channel comprises a linear propagation channel configured to take in light received by one of the first diffraction gratings, propagate the light, and guide the light to the second diffraction grating.

4. The optical density measuring apparatus of claim 1, wherein the core layer further comprises a second diffraction grating configured to take in light from the propagation channel and output the light to the detector, and
   wherein the propagation channel comprises a branched propagation channel comprising a linear portion positioned in a central region of the branched propagation channel, a plurality of first diffraction grating side portions configured to take in the light received by the first diffraction gratings, a converging portion where propagation channels converge from the first diffraction grating side portions to the linear portion, and a second diffraction grating side portion configured to guide light propagated through the linear portion towards the second diffraction grating.

5. The optical density measuring apparatus of claim 3, wherein the second diffraction grating is disposed near to and facing the detector.

6. The optical density measuring apparatus of claim 3, wherein a structure of the second diffraction grating is identical to a structure of the first diffraction gratings or is a modification to a structure of the first diffraction gratings.

7. The optical density measuring apparatus of claim 1, wherein at least one of the first diffraction gratings has a maximum diffraction grating length of $20\lambda$ or less, where $\lambda$ represents an average wavelength of light in a vacuum.

8. The optical density measuring apparatus of claim 1, wherein at least one of the first diffraction gratings has a maximum diffraction grating length of $10\lambda$ or less, where $\lambda$ represents an average wavelength of light in a vacuum.

9. The optical density measuring apparatus of claim 1, wherein at least one of the first diffraction gratings has a maximum diffraction grating length of $5\lambda$ or less, where $\lambda$ represents an average wavelength of light in a vacuum.

10. The optical density measuring apparatus of claim 1, wherein the core layer comprises four or more of the first diffraction gratings.

11. The optical density measuring apparatus of claim 1, wherein the first diffraction gratings are arranged periodically in plan view of the optical waveguide.

12. The optical density measuring apparatus of claim 1, wherein at least two of the first diffraction gratings are connected to the propagation channel in opposite directions in plan view of the optical waveguide.

13. The optical density measuring apparatus of claim 1, wherein the light emitted from the same light-emitting surface of the light source reaches the at least two of the first diffraction gratings directly after passing through a slight space.

14. The optical density measuring apparatus of claim 1, wherein a ratio of a total area of the first diffraction gratings covered by the light-emitting surface of the light source to an area of the light-emitting surface is 30% or more.

15. The optical density measuring apparatus of claim 1, wherein a ratio of a total area of the first diffraction gratings covered by the light-emitting surface of the light source to an area of the light-emitting surface is 60% or more.

16. An optical waveguide for use in an optical density measuring apparatus for measuring density of a gas or a liquid to be measured, the optical waveguide comprising:
   a substrate;
   a core layer comprising a propagation channel capable of propagating light in an extending direction thereof, and a plurality of first diffraction gratings configured to receive the light from a light source and guide the light to the propagation channel; and
   a support configured to connect at least a portion of the substrate with at least a portion of the core layer and support the core layer with respect to the substrate,
   wherein the plurality of the first diffraction gratings are disposed near to and facing a light-emitting surface of the light source,
   wherein a length between the light-emitting surface of the light source and the plurality of the first diffraction gratings is 1 mm or less, or $\sqrt{Ss}$ or less where Ss is an area of a same light-emitting surface of the light source,
   wherein at least two of the first diffraction gratings are configured to receive light emitted from the same light-emitting surface of the light source, and
   wherein the area of the same light-emitting surface of the light source is greater than an area of one of the at least two of the first diffraction gratings.

17. The optical waveguide of claim 16, wherein a spectrum yielded by combining a selected wavelength spectrum of each of the first diffraction gratings is unimodal.

18. The optical waveguide of claim 16, wherein at least one of the first diffraction gratings has a maximum diffraction grating length of $20\lambda$ or less, where $\lambda$ represents an average wavelength of light in a vacuum.

19. The optical waveguide of claim 16, wherein the first diffraction gratings are arranged periodically in plan view of the optical waveguide.

20. The optical waveguide of claim 16, wherein the light emitted from the same light-emitting surface of the light source reaches the at least two of the first diffraction gratings directly after passing through a slight space.

* * * * *